(12) United States Patent
Lamothe

(10) Patent No.: US 6,798,219 B2
(45) Date of Patent: Sep. 28, 2004

(54) ELECTRONIC DEVICE FOR MONITORING THE TEMPERATURE OF A MEDIUM TO BE MONITORED AND METHOD FOR IMPLEMENTING THE SAME

(75) Inventor: Christian Lamothe, Neuchâtel (CH)

(73) Assignee: EM Microelectronic-Marin SA, Marin (CH)

( * ) Notice: Subject to any disclaimer, the term of this patent is extended or adjusted under 35 U.S.C. 154(b) by 84 days.

(21) Appl. No.: 10/154,814

(22) Filed: May 28, 2002

(65) Prior Publication Data

US 2002/0180406 A1 Dec. 5, 2002

(30) Foreign Application Priority Data

May 29, 2001 (EP) ............................................. 01202020

(51) Int. Cl.⁷ .......................... G01N 27/00; G01K 7/34; H01H 37/52
(52) U.S. Cl. ...................... 324/685; 324/71.1; 324/417; 374/170; 337/379
(58) Field of Search ............................... 324/685, 71.1, 324/417–419, 548, 426–436; 337/36, 333, 379, 111, 114; 340/572.1; 370/205, 159, 160, 170

(56) References Cited

U.S. PATENT DOCUMENTS

| | | | | |
|---|---|---|---|---|
| 4,121,461 A | * | 10/1978 | Butler et al. ................. | 374/171 |
| 4,607,219 A | * | 8/1986 | Isosaka ......................... | 438/15 |
| 5,066,104 A | * | 11/1991 | Mohebban et al. .......... | 349/199 |
| 5,773,978 A | * | 6/1998 | Becker ......................... | 324/430 |
| 5,969,606 A | * | 10/1999 | Reber et al. ................. | 340/540 |
| 6,064,295 A | * | 5/2000 | Becher et al. ............... | 337/349 |
| 6,323,447 B1 | * | 11/2001 | Kondoh et al. .............. | 200/182 |
| 6,369,577 B1 | * | 4/2002 | Cho .............................. | 324/426 |
| 6,452,475 B1 | * | 9/2002 | Kawazu et al. .............. | 337/290 |

FOREIGN PATENT DOCUMENTS

| | | |
|---|---|---|
| EP | 0 441 324 A1 | 8/1991 |
| FR | 2 764 977 | 12/1998 |
| WO | WO 94/14133 | 6/1994 |
| WO | WO 94/27117 | 11/1994 |

OTHER PUBLICATIONS

Patent Abstract of Japan, vol. 009, No. 151, Jun. 26, 1985 & JP 60 029678, Feb. 15, 1985.

* cited by examiner

*Primary Examiner*—Anjan K. Deb
(74) *Attorney, Agent, or Firm*—Sughrue Mion, PLLC

(57) ABSTRACT

Electronic device for monitoring the temperature of a medium ensures that the temperature has not reached pre-established index limit values. The device includes contacts for closing an electric charge flow circuit when the temperature reaches an index limit value, an electric charge storage component connected to the charge flow circuit when the contacts close, the charges remain stored as long as the temperature does not reach one of its index limit values, and is able to flow through the charge flow circuit when the circuit is closed by the contacts, the charge storage not returning to the charge state which they had before the charge flow circuit closed if the latter opens again, and a provision for reading enabling the charge state to be determined.

30 Claims, 18 Drawing Sheets

ELECTRONIC DEVICE FOR MONITORING THE TEMPERATURE OF A MEDIUM TO BE MONITORED AND METHOD FOR IMPLEMENTING THE SAME

BACKGROUND OF THE INVENTION

The present invention concerns an electronic device for monitoring the temperature of a medium to be monitored and a method for implementing the same.

For numerous products, such as frozen food or certain pharmaceutical specialities, it is necessary to be able to check that a product, kept at a temperature lower than 0° C., has not, at any time, been subjected to a rise in temperature above a predetermined threshold. Such products can, in fact, go bad and present a real danger to the consumer if they are not subject to a strict respect for the cold chain between the moments when they are frozen and when they are used.

There currently exist a multitude of warning devices, which indicate permanently and irreversibly whether a temperature has passed a fixed threshold.

Certain of these devices include, for example, a substrate made of paper, cardboard or other material, in the shape of a coloured tongue or disc covered with an opaque resin layer with a determined melting point. This resin is coloured in a different shade from that of the substrate as to cover the shade of the substrate.

If, following a rise in temperature, the resin melts, it flows away and allows the substrate to appear, the colour of the substrate being indicative and revealing that the resin melting temperature threshold has been reached or exceeded.

Other temperature monitoring devices include a material with calorimetric moisture detective agent qualities. This material, which may be a powder or crystals, has the property of changing colour on contact with water, passing for example from uncoloured to red. The calorimetric detective agent is placed in the presence of a liquid with antifreeze qualities such as a mixture of water and alcohol. It is the proportion of water and alcohol which will determine a precise solidifying and melting temperature for the mixture.

The device is placed as an indicator on the merchandise when it is cold stored (quick-frozen or deep-frozen). Provided the product and its indicator are kept at a temperature lower than the melting point of the antifreeze/water mixture, nothing happens since the ice has no effect on the calorimetric moisture detector. The indicator remains its initial colour.

However, if the merchandise and its indicator are brought to a temperature higher than the melting point of the antifreeze/water mixture, the ice begins to melt and the liquid comes into contact with the moisture detector. The indicator changes colour.

From then on, any new exposure to the cold, even higher than the solidifying point of the mixture, can in no way modify the colour of the indicator, which remains irreversibly changed.

Devices of the aforementioned type have to be applied to each item of merchandise and be accompanied, if required, by an explanatory note. They thus have the drawback of requiring an individual check of each device, either by the distributor for example, when the merchandise is received and at the moment that they are actually put on sale, or by the consumer himself, at the moment of purchase. Consequently, this check requires very particular care, whether by the distributor, by the person responsible for the counter where the merchandise is sold, or by the consumer. It also requires a relatively long checking time since each item of merchandise has to be individually checked.

Unfortunately, for economic reasons or simply by negligence, this check may appear too tiresome to certain distributors or wholesalers who do not take the time to check individually each of the articles which they sell. Thus, only certain articles will be checked, for example randomly, or, in the worst case, none of the articles will ever be checked. This results in a significant risk that the client will be deceived, and such deceit may even be carried out knowingly.

In practice, the aforecited indicator devices are only rarely used, because they only allow a check to be performed at the end of the chain, i.e. by the consumer, and because they are not sufficiently reliable.

Moreover, it should be noted that the known indicators are usually only intended for deep-frozen products, nothing having been provided for refrigerated produce such as dairy produce.

SUMMARY OF THE INVENTION

The object of the present invention is to overcome the aforementioned drawbacks in addition to others, by proposing an inexpensive electronic temperature monitoring device, which enables one to make sure, simply and efficiently, that the temperature has not, at any time, crossed a predetermined index value.

The present invention therefore concerns an electronic device for monitoring the temperature of a medium to be monitored enabling one to make sure that the temperature has not reached at least a pre-established index limit value, characterised in that it includes:

electrically conductive contact means able to close an electric charge flow circuit when said temperature reaches the or one of the index limit values;

electric charge storage means able to be connected to the charge flow circuit when the contact means close, the charges stored in these storage means being kept as long as the temperature does not reach its or one of its index limit values, and being able to flow through said charge flow circuit when the circuit is closed by said contact means, said storage means not returning to the charge state which they had before the charge circuit closed if the latter opens again, and read means determining the charge state of said storage means.

As a result of these features, the present invention provides a totally passive electronic device for checking whether a temperature has experienced a rise beyond a fixed threshold. Indeed, during the entire temperature monitoring period, the electronic device according to the invention does not require any current or voltage supply to be able to operate, only the initial phase of injecting the electric charges into the storage means of said electronic device requiring the device to be powered.

After this first step of writing in the storage means, the electronic device thus operates in a totally autonomous manner. Affixed as an indicator to the product whose temperature has to be controlled, the electronic device keeps its initial state of electric charge provided that nothing happens, i.e. as long as the temperature does not reach its critical value. As soon as that value is reached, the contact means connect the storage means to the charge flow circuit, and the charges stored in said storage means instantly escape. Thus, the charge state of the storage means is indicative of temperature change during the monitoring period. If they are charged at their initial charge level, the storage means indicate, during the check, that the temperature has not undergone any variation capable of altering the qualities of the product to be monitored. Conversely, if a modification in the charge state of the storage means is observed during the check, this means that the temperature has reached its index value at least once during the monitoring period.

Advantageously, the modification in the charge state of the storage means is irreversible. If the temperature has momentarily reached, for example a maximum, and it returns to below this maximum before the check is carried out, the storage means will never return to their initial charge state, the charges being unable to flow back from the charge flow circuit to said storage means. The present invention thus provides an inviolable device in which the record of a temperature crossing an index value cannot be deleted or modified.

Finally, it is a variation in the electric charge and not, for example, a change of colour as is the case in the prior art, which indicates to the user that the temperature has reached its index value. This constitutes substantial progress insofar as appreciation of a colour is difficult and always subject to the observer's subjectivity, such as the end consumer of the product, whereas an electric variable is an objective parameter which can be perfectly measured and quantified. Further, the values of an electric variable, current or voltage, can be stored in a computer and kept there indefinitely, for example for the purpose of statistical research.

According to another feature of the invention, the electronic temperature monitoring device can be associated with an electronic tag. Such electronic tags are well known to those skilled in the art. They are commonly used to distinguish and identify the objects to which they are affixed. Such tags are provided with a device for receiving and transmitting electromagnetic waves coupled to an electronic module for processing the received signals and retransmitting others able to include, for example, a message for identifying the tag, and thus the object to which it is affixed. Moreover, the system includes a reader including an electromagnetic wave transceiver device for transmitting data between a data terminal and said electronic tag.

The reader fulfils several functions, used in particular for:
transmitting to the tag the power necessary for it to function, the tag not having any specific autonomous power source;
transmitting to the tag data originating from the terminal, this data being able to be written in and out of a memory with which the tag is provided, and
receiving data originating from the tag and specific thereto, in particular for the purpose of identifying it.

In order to perform these various transmissions, the reader includes one or more antennae formed of coils, which are used for transmission and reception.

The tag also includes one or more antennae for receiving the electromagnetic waves transmitted by the reader, each of these antennae also being used for the transmission of data to the reader. In reception mode, the antenna or antennae form induction receiving means for energy originating from the reader, and means for receiving data transmitted therefrom. The antenna is connected to a processor including the means necessary for demodulating the signals received by the antenna, and for coding and modulating the signals to be retransmitted.

The tag provides, via its antenna, the energy necessary to power the read means of the electronic temperature monitoring device according to the invention. Moreover, as a result of the presence of these tags, the reader can simultaneously check a multiplicity of products to which the tags are affixed. It is thus no longer necessary to check the products one by one. Moreover, since the reader can read each tag's identification message, it can very easily determine which articles have been exposed, even momentarily, to a temperature having reached the critical threshold. These products can then be rapidly withdrawn from the distribution chain.

Another advantage of the joint use of an electronic tag with the temperature monitoring device lies in the fact that, since the check of the storage means' charge state is performed remotely, the monitoring device can be arranged inside the packaging containing the product to be preserved, rather than being simply added to the exterior of said packaging.

This constitutes another important advantage of the present invention. Indeed, the devices of the prior art which have to be visible in order to be able to be checked, and which are thus affixed to the outer packaging of the products, can indicate an entirely momentary heating which affects only the outer superficial part of the packaging and which is not damaging for the product to be preserved. Such a method is thus liable to cause significant quantities of products which have not been affected, to be rejected.

Other manufacturers have proposed placing an indicator in each deep-frozen packet and no longer on the outside thereof (on the packaging) as described hereinbefore. In this case, it is the consumer and only the consumer who, upon opening the deep-frozen article, can judge whether the indicator appears normal, the consumer being able to be guided by an explanatory note joined to the deep-frozen article.

In addition to the fact that observing the indicator cannot reveal with certainty whether or not the cold chain has been broken, the consumer may find himself in possession of food unfit for consumption which he will nonetheless have paid the seller for. In practice, this is unacceptable.

The present invention thus also concerns a method for implementing the electronic temperature monitoring device of the type described above, characterised in that it consists in:
writing data by injecting electric charges into the charge storage means;
placing the electronic device in the medium whose temperature evolution one wishes to monitor in order to ensure that this temperature has not reached at least one pre-established index limit value;
reading, in a non destructive manner, while the device is still in the medium to be monitored, the data written in the charge storage means, so as to determine whether or not the temperature of said medium to be monitored has, at a given moment, reached its or one of its pre-established index limit values, knowing that if the temperature has not reached its or one of its index limit values, the contact means have not closed and the charge state of the charge storage means has remained unchanged, whereas if the temperature has reached its or one of its index limit values, the contact means have closed and the charge state of the charge storage means has been modified, this modified charge state of the charge storage means being preserved even if the temperature of the medium being monitored again passes below or beyond the index value which it has reached and the contact means open again;
continuing or stopping temperature monitoring and, if necessary,
reprogramming the electronic temperature monitoring device in order to use it again.

Other features and advantages of the present invention will appear more clearly from the following description of an example embodiment of the temperature monitoring device according to the invention, this example being given purely by way of non limiting illustration in conjunction with the annexed drawings, in which:

DETAILED DESCRIPTION OF THE INVENTION

Figure 1A:
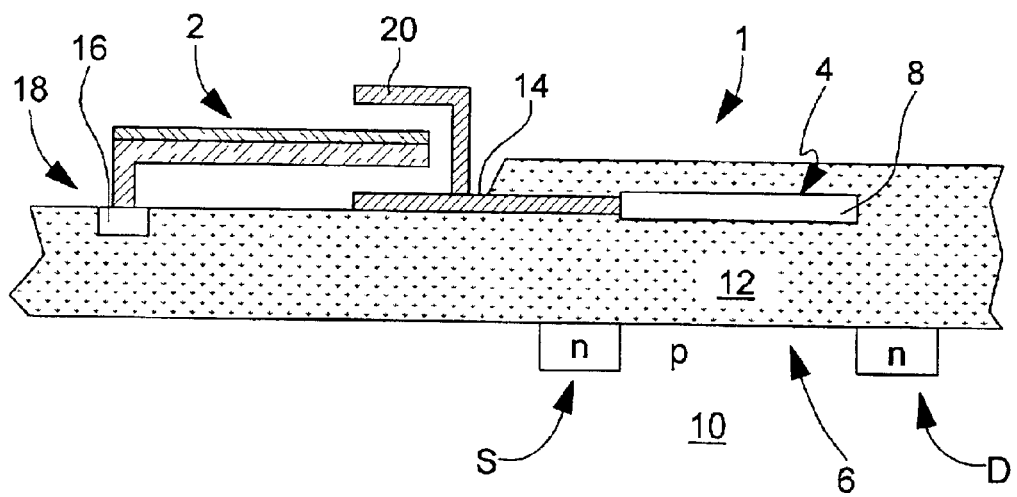
FIG. 1A is a cross-section of the temperature monitoring device according to the invention including an MOS type transistor.

The present invention proceeds from the general inventive idea which consists in following the temperature fluctuations of a medium to be monitored and in making sure that this temperature has not reached a predetermined threshold value by using a passive and inviolable electronic device whose record of an index value being breached during the monitoring period cannot be deleted or modified. The breach, even if punctual, of the temperature threshold, instantly results in the irreversible modification in the value of an electric charge, a parameter which can easily be measured and which subsequently be stored in a computer memory to be processed and analysed therein. This constitutes real progress with respect to the monitoring indicator devices of the prior art which have the power to change colour when the temperature monitored undergoes an increase beyond a fixed threshold, insofar as such a change in colour does not always provide a reliable indication and is left to the subjective judgment of the observer such as the end consumer of the product.

In its simplest embodiment (see FIGS. 1A and 1B), the temperature monitoring device 1 according to the invention essentially includes contact means 2, electric charge storage means 4 and means 6 for reading the charge state of charge storage means 4.

The contact means or thermo-contact means 2 include a passive element which enables an electric contact to be established depending on the temperature of the medium in which it is located.

The physical or physico-chemical phenomena implemented by contact means 2 are, for example, fusion of a solid material. Indeed, contact means 2 can be formed by an electrically conductive matter with a precise solidifying and melting temperature. It will be understood here that this matter has to remain in the solid state as long as the temperature to be monitored has not reached the threshold which has been fixed, and has to pass to the liquid state as soon as the temperature breaches this threshold. One example of such a material is formed by a mixture of water and anti-freeze liquid such as alcohol the proportions of which determine the solidifying and melting temperature of the mixture. According to the invention, electronic temperature monitoring device 1 is enclosed in a phial, for example made of glass, into which the mixture of water and alcohol has been introduced beforehand. Of course, this operation is performed at a temperature at which the water and alcohol mixture is in the solid state. After introducing electronic device 1 into the phial, the latter is hermetically sealed, then affixed to the article whose temperature has to be monitored.

Contact means 2 may also involve an expansion and contraction phenomenon of a solid material as a function of temperature fluctuations. This may be metal material or an alloy of such materials selected, for example, from the group formed by aluminium, silver, copper, steel, iron, invar, nickel, gold, platinum, lead, silicon, tungsten and zinc.

According to a first variant, contact means 2 take the form of a simple rectilinear bar.

According to a second variant shown, in particular, in FIG. 1A, contact means 2 take the form of a bimetalic switch conventionally formed of two strips of metal or alloys with different thermal expansion coefficients and welded together, so that the assembly bends when the temperature changes. An example embodiment of such a bimetalic switch will be presented in detail at the end of the present description.

According to another variant, contact means 2 are formed of a temperature memory alloy.

Electric charge storage means 4 include a capacitor plate 8 which, in the remainder of the following description, will be called a floating gate. This capacitor plate or floating gate 8 can, if required, be associated with an auxiliary capacitor to reinforce, if necessary, its capacitive effect. Floating gate 8, capable of storing electric charges, is perfectly electrically insulated from any junction, but it is nonetheless accessible via contact means 2. It is made of an electrically insulated conductive or semiconductor material and arranged facing a substrate 10 made of semiconductor material forming the other plate of capacitor 8. The electrically insulating layer 12 which separates floating gate 8 from the other capacitor plate 10 will, for example, be made of silica, nitride or any other material which offers sufficient electric insulation power. Floating gate 8 is thus insulated and has no current leakage during the entire temperature monitoring phase, which excludes the possibility of floating gate 8 being connected to a PN junction capable of having charge leakage. Indeed, during the temperature monitoring phase, only contact means 2 are capable of modifying the charge state of floating gate 8.

Read means 6 take the form of a semiconductor device associated with floating gate 8, such that the charge state of said floating gate 8 has a direct influence on the conduction state of these read means 6 and thus on their impedance.

Various embodiments of read means 6 can be envisaged. According to a first variant (not shown), floating gate 8 can be coupled to a PN junction. Depending on its charge state, floating gate 8 modulates the leakage currents of the PN junction and thus modifies the characteristic current/voltage shape thereof.

According to a second embodiment (also not shown), floating gate 8 is coupled to a bipolar transistor whose gain it modifies as a function of its charge state.

In its most common embodiment shown in FIG. 1A, floating gate 8 is associated with an MOS transistor which may be an enhancement or depletion transistor. Floating gate 8 is capable, as a function of its charge state, of creating or modifying the state of conduction of, for example an n type channel, between the source S and the drain D of this MOS transistor.

As already mentioned hereinbefore, floating gate 8 is thus called since it is electrically insulated from any junctions. According to the invention, floating gate 8 has, however, an electric contact point 14 which is accessible from the exterior and which can be placed in connection with an electric connection point 16 of a charge flow circuit 18. A contact part 20 is electrically connected to floating gate 8 at contact point 14 thereof, whereas contact means 2 are connected to contact point 16 of electric charge flow circuit 18.

Floating gate 8 is thus capable of being connected to charge flow circuit 18 when contact means 2 close and come into contact with contact part 20. It will be understood that contact means 2 are designed so as to establish an electric contact with contact part 20 only when the temperature of the medium being monitored breaches its or one of its pre-established index limit values. Thus, the charges stored in floating gate 8 are preserved as long as the temperature does not reach its index value, and can flow through charge flow circuit 18 when the temperature reaches its index value and said charge flow circuit 18 is closed by contact means 2.

Advantageously, floating gate 8 does not return to the charge state it had before charge flow circuit 18 closed in case the latter again opened because the temperature passed, for example below its maximum. Indeed, it is impossible for the charges to flow back from charge flow circuit 18 to floating gate 8. The modification to the charge state of floating gate 8 is thus irreversible, which provides an inviolable electronic temperature monitoring device 1 whose record of the breach of an index value by the temperature cannot be deleted or modified. The charge state of floating gate 8 is consequently indicative of the evolution of the temperature during the monitoring period. If it is still charged at its initial charge level during the check, floating gate 8 will indicate that, at no time, has the temperature reached its index value and that the product being monitored has not undergone any degradation liable to alter its qualities. Conversely, if a modification to the charge state of floating gate 8 is observed during the check, this will mean that the temperature has reached its index value at least once.

As will have been understood from the foregoing, electronic device 1 according to the invention is characterised by its ability to keep its own charge state whatever happens. Indeed, either the temperature has never reached its index value when the check is carried out, and in this case monitoring device 1 has kept its initial charge state, or the temperature has reached its index value at least once, and in this case the charge state of monitoring device 1 is modified and subsequently kept, whatever the future evolution of the temperature.

In the event that a mixture of water and alcohol, for example, has been used, either the temperature has not reached its authorised maximum and this case nothing happens, i.e. the water/alcohol mixture remains solid and does not melt. Or the temperature reaches, even only momentarily, its maximum, and in this case the water and alcohol mixture melts. By melting, the mixture flows onto contact points 14 and 16 and electrically connects floating gate 8 to charge flow circuit 18. Consequently, floating gate 8 is discharged into said charge flow circuit 18 and keeps its discharged state even if the temperature subsequently passes below its maximum again.

However, a bimetalic switch has the advantage, compared to a water and alcohol mixture, of enabling a product to be monitored, for example milk or wine, which has to be kept refrigerated, i.e. at temperatures higher than 0° C. Indeed, the thermal expansion coefficients of metals or metal alloys used to make the bimetalic switchs are substantially constant as regards the temperature and are indifferent to the transition between positive temperatures and negative temperatures either side of 0° C. Thus, one need only carefully choose the metals used to make the bimetalic switch so that the latter bends in a suitable way to close charge flow circuit 18 when the temperature breaches its index limit value.

Electronic temperature monitoring device 1 according to the invention includes, finally, the aforementioned read means 6 which allow the charge state of floating gate 8 to be determined in a non destructive manner, at any time during the monitoring period.

In the example shown in FIG. 1A, temperature monitoring device 1 includes an MOS type transistor whose electrically insulated gate forms electric charge storage means 4, and whose, for example, n type source S and drain D, form read means 6. In order to determine the charge state of floating gate 8, a voltage or current is applied across the terminals of read means 6 which, in response, provides a current, or respectively a voltage, allowing the electric resistance of read means 6 to be determined, and thus the charge state of said floating gate 8. Indeed, the potential to which gate 8 is brought has a direct influence on the state of conduction of the channel connecting source S to drain D of the MOS transistor.

Figure 1B:
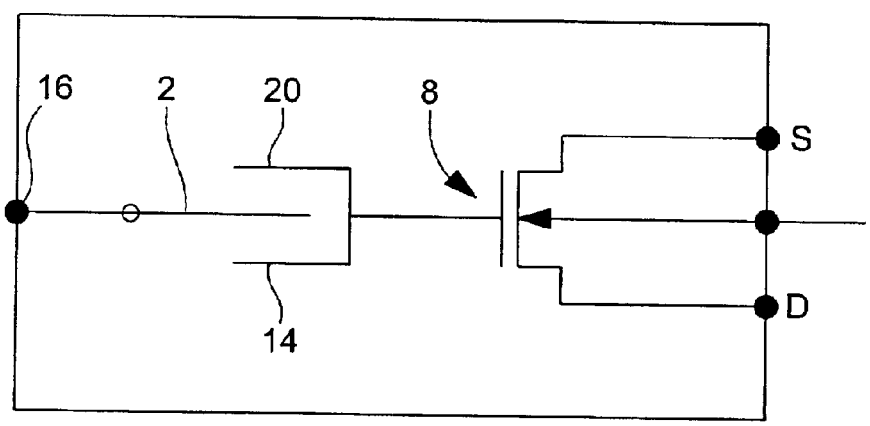
FIG. 1B is a schematic diagram of the equivalent electric circuit of the monitoring device shown in cross-section in FIG. 1A.

FIG. 1B is a schematic diagram of the equivalent electric circuit to the temperature monitoring device 1 according to the invention shown in cross-section in FIG. 1A.

Figure 2A:
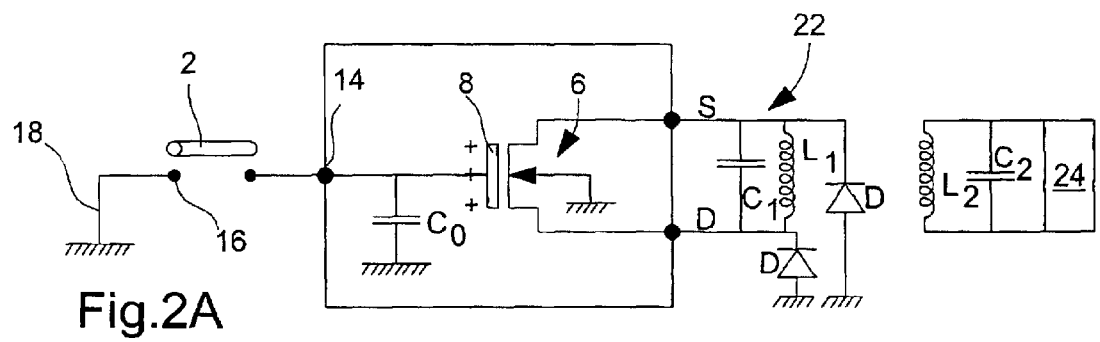
FIGS. 2A to 2H illustrate the temperature monitoring phase by means of the monitoring device according to the invention.

We will now examine, with reference to FIG. 2A and the following Figures, the temperature monitoring phase, without for the moment worrying about the phase of injecting or writing the electric charges in the floating gate which will form the subject of the following part of the description and which, as will be seen, obeys different principles.

As can be seen in FIG. 2A, contact means 2 are shown in the form of a bar of solid material able to melt when the temperature breaches its pre-established index limit value and to electrically connect electric contact point 14 of floating gate 8 to electric contact point 16 of electric charge flow circuit 18. An auxiliary capacitor $C_0$ is associated with floating gate 8 to reinforce its capacitive effect.

In order to be able to evaluate the impedance of read means 6 and thus to determine the charge state of floating gate 8, an oscillator circuit 22, formed of a capacitor $C_1$ and a coil $L_1$ mounted in parallel, can be associated with read means 6. Two diodes D enable the free ends of oscillator circuit 22 to be fixed to an index potential. The quality factor of oscillator circuit 22 when floating gate 8 is charged will be called here for example $Q_C$. This quality factor $Q_C$ is capable of being modified as a function of the impedance of read means 6, i.e. as a function of the charge state of floating gate 8.

A remote interrogation device 24 also including an oscillator circuit forming an antenna, is provided. This oscillator circuit 24 is formed of a capacitor $C_2$ and a coil $L_2$ mounted in parallel. An oscillator circuit 24 of this type can be coupled via electromagnetic waves to read means 6 of temperature monitoring device 1 according to the invention. A system of this type is currently used with electronic tags for remote communication.

Figure 2B:
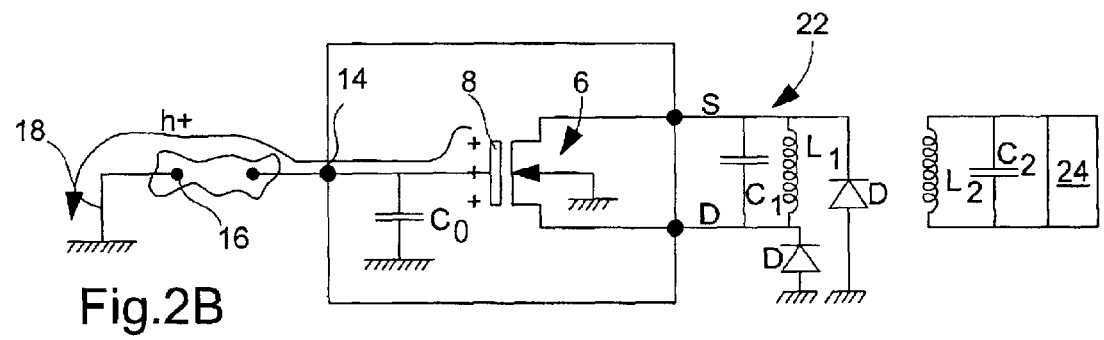

FIG. 2B shows that the bar of solid material forming contact means 2 of temperature monitoring device 1 has melted, which means that the temperature has, at least once during the monitoring period, breached its index limit value. Electric contact points 14 and 16 are then electrically connected to each other by the melted material, which has the effect of causing the electric charges which, until then, were stored in floating gate 8, to flow into charge flow circuit 18. Since floating gate 8 is then emptied of its electric charges, this has a direct influence on the quality factor of oscillator circuit 22 associated with read means 6, which takes a value $Q_D$. If one then wishes to evaluate the charge state of monitoring device 1 by means of remote interrogation device 24, the processor associated with interrogation device 24 can discriminate between the quality factor values $Q_C$ and $Q_D$ of read means 6 and conclude therefrom that the product to which said monitoring device 1 has been affixed has to be rejected.

Of course, it is not necessary for the electric contact to be kept between contact points 14 and 16 once the charges which were stored in floating gate 8 have flowed out. Indeed, the fact that the electric charge between contact points 14 and 16 can be broken when the temperature again passes below its maximum and that the conductive material moves back from these contact points 14 and 16 and solidifies, has no effect on the operation of monitoring device 1, since the electric charges cannot flow back into floating gate 8.

Figure 2C:
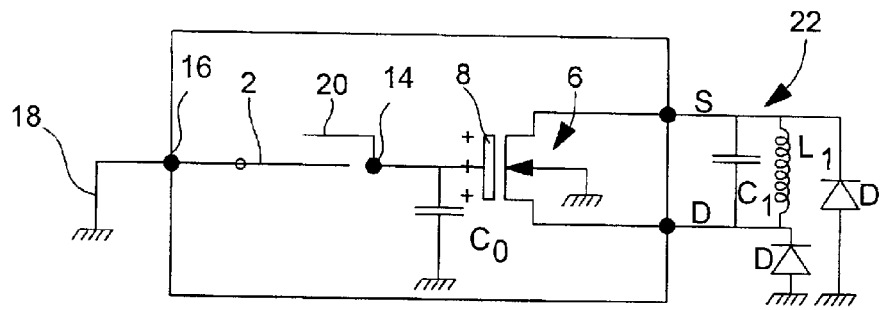
Figure 2D:
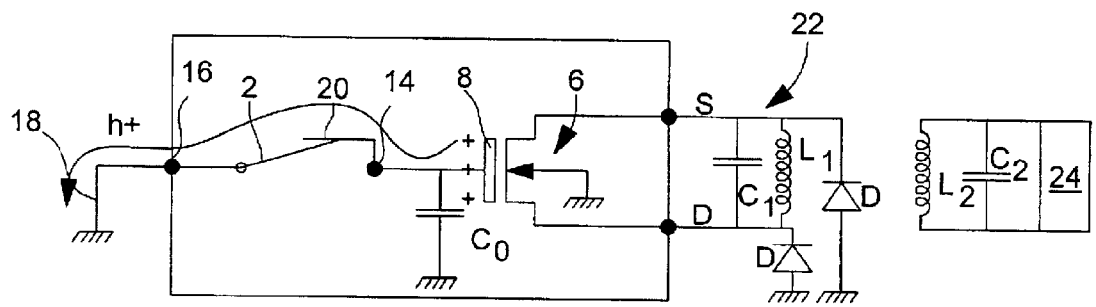
Figure 2E:
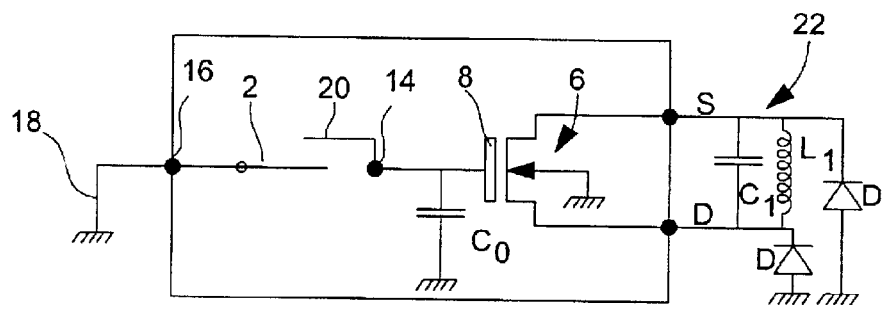

FIGS. 2C to 2E are similar to FIGS. 2A and 2B described hereinbefore the only difference being that contact means 2 are formed in this case of a bimetalic switch.

In FIG. 2C, temperature monitoring device 1 is shown in conditions of use in which it is affixed to the product to be monitored. Contact means 2, in other words the bimetalic switch, are open, and electric charges are stored in the floating gate, without any possibility of flowing out, which means that the temperature has not yet reached its index limit value. If, at this moment, monitoring device 1 is interrogated in a non destructive manner by means of remote interrogation device 24, it will be observed that the measured value of the quality factor of oscillating circuit 22 corresponds to the charged state of floating gate 8, i.e. $Q_C$.

When the temperature reaches its index limit value, bimetalic switch 2 comes into contact with contact part 20 (see FIG. 2D), thus electrically connecting floating gate 8 to electric charge flow circuit 18. The electric charges which, until then, have been stored in floating gate 8, will flow through bimetalic switch 2 into charge flow circuit 18. If the charge state of floating gate 8 is then evaluated, by means of remote interrogation device 24, one will be able to detect quality factor values $Q_C$ and $Q_D$ of oscillating circuit 22, corresponding respectively to the charged state and discharged state of said floating gate 8, and deduce therefrom that the temperature has breached its index limit value and that the product to which temperature monitoring device is associated has to be rejected.

In FIG. 2E, floating gate 8 is discharged and bimetalic switch 2 is open, which means that the temperature has again passed below its limit threshold. It goes without saying however, that once floating gate 8 is discharged, it cannot be subsequently recharged, whether bimetalic switch 2 remains in contact with contact part 20 or opens again.

The choice of materials used to make bimetalic switch 2 is dictated by the value of the index limit temperature which one wishes to measure. By selecting these materials carefully, one could make a bimetalic switch 2 which will close and establish the electric contact between floating gate 8 and charge flow circuit 18 when the temperature reaches its index limit value, either by increasing, or by decreasing.

Figure 2F:
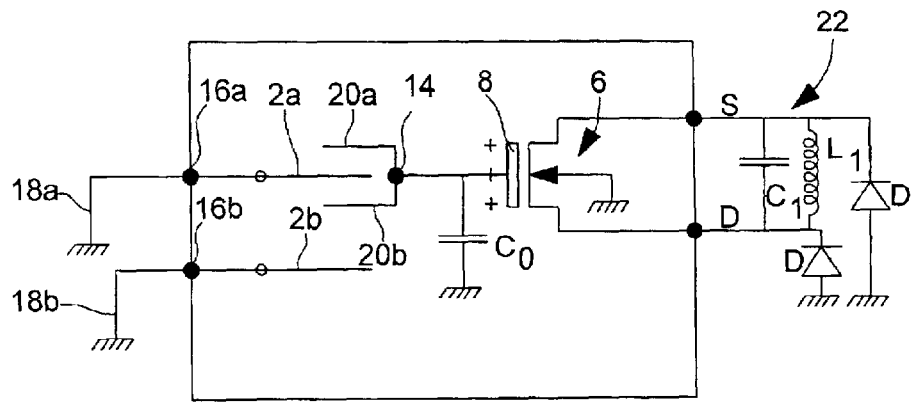
Figure 2G:
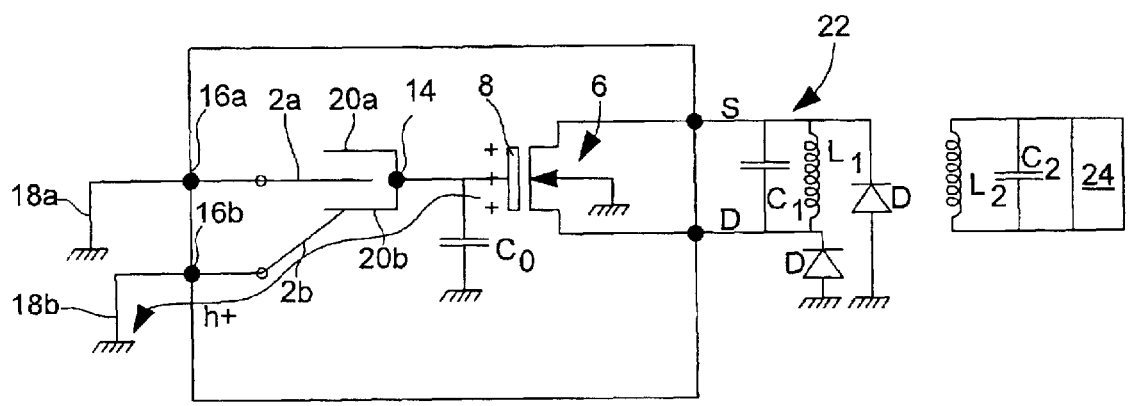
Figure 2H:
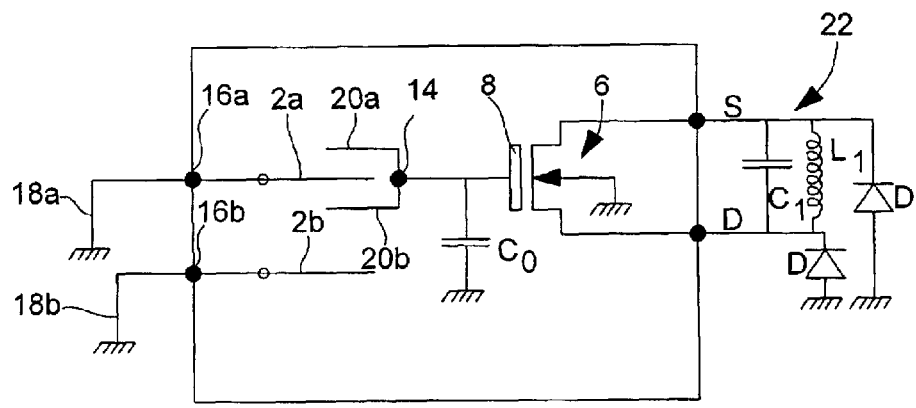

FIGS. 2F to 2H are similar to FIGS. 2C to 2E described hereinbefore the only difference being that two bimetalic switchs 2a and 2b are used, each capable of contacting a contact part, respectively 20a and 20b, depending upon whether the temperature reaches a lower index limit value or an upper index limit value. Thus, FIG. 2G shows that bimetalic switch 2b is closed, which means, for example, that the temperature to be monitored has reached its minimum index limit value. With such an arrangement, one can thus check two distinct temperatures at once. This proves particularly advantageous when an arrangement of this type is used for keeping a product such as wine, which is known to be unable to tolerate both high temperatures and cold.

Until now, only the use of temperature monitoring device 1 according to the invention during the temperature monitoring and checking phase has been described. This monitoring phase implements:

passive contact means 2, which enable an electric contact to be established as a function of the temperature of the medium in which monitoring device 1 is arranged;

electric charge storage means 4 in the form of a floating gate 8 which is electrically insulated from any junctions and whose electric charge state is indicative of the evolution of the temperature during the monitoring period preceding the moment that the check is carried out;

semiconductor read means 6 whose electric impedance is a function of the charge state of floating gate 8 and which thus allow the charge state of said gate 8 to be determined.

One will now examine the initial use phase of monitoring device 1 according to the invention, during which the electric charges are brought onto floating gate 8. Depending upon the technology chosen to make floating gate 8, various methods for writing or programming gate 8 may be used. More precisely, the method which will have to be used to charge floating gate 8 will depend upon whether an MOS technology or a technology implementing non volatile memories which are specially designed to assure a data storage function, is used to make said gate 8.

Moreover, the various methods for programming floating gate 8 may be destructive and thus not allow monitoring device 1 to be used again subsequently, or non destructive and in such case allow said monitoring device 1 to be recycled.

Figure 3A:
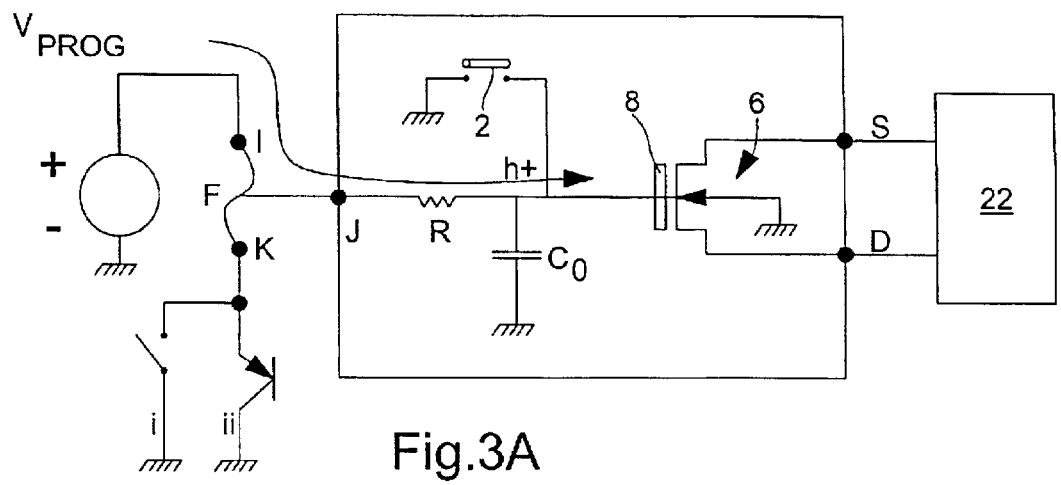
FIGS. 3A to 3C illustrate the electric charge write phase in the temperature monitoring device according to the invention.
Figure 3B:
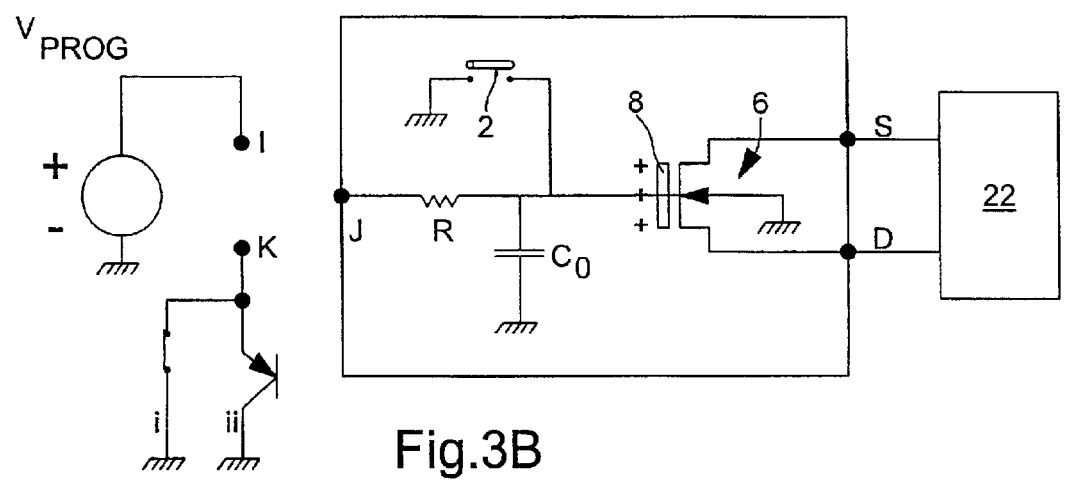

A first alternative implementation of the method for charging floating gate 8 of temperature monitoring device 1 made using MOS or CMOS technology is shown with reference to FIG. 3A and the following Figures. It will be noted that, according to this first variant, charges are injected into floating gate 8 while contact means 2 are open or deactivated ("deactivated" means that contact means 2 are momentarily made non conductive). Consequently, the temperature to be monitored is at an authorised value at which the properties of the product to be checked are preserved. As can be seen in FIG. 3A, a charge voltage $V_{PROG}$ is first of all applied to floating gate 8 and possibly to an auxiliary capacitor $C_0$ which reinforces the capacitive effect of said floating gate 8 if said effect is not in itself sufficient. The current which charges floating gate 8 passes through a resistor R which is intended to limit losses during the subsequent destruction of a fuse F. Secondly (see FIG. 3B), floating gate 8 is insulated from any electric connection with the exterior by forcing a sufficiently intense current to pass through fuse F so as to destroy it. Two solutions can be envisaged to do this. The first solution consists in closing a switch i, so that an intense current flows between the positive pole of the current source and the negative pole thereof which is formed by earth to which switch i is connected, this current passing through fuse F and destroying it. The second solution consists in using a bipolar or MOS transistor ii, this transistor ii being in the OFF state for the whole time that floating gate 8 is being charged, and in the ON state when charging has finished. Transistor ii plays the same role as switch i described hereinbefore. It enables a sufficiently intense current to pass through fuse F and destroy it. Once fuse F has been destroyed, points I, J and K via which floating gate 8 was connected to the external charge circuit are perfectly insulated, so that the electric charges stored in said floating gate 8 cannot flow out.

Figure 3C:
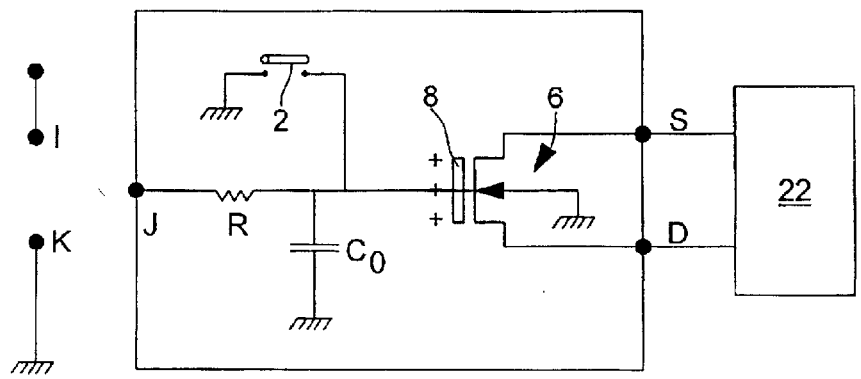

Finally, FIG. 3C shows monitoring device 1 in conditions of use, electric charges being stored in floating gate 8 and contact means 2, shown in the form of a solid material capable of melting in the event that the temperature breaches its index limit value, being open. As will have been understood, this first embodiment of monitoring device 1 can only be used once, the destruction of fuse F preventing said device 1 from being used again subsequently.

For reasons of convenience and comprehension of the invention, contact means 2 will be shown, in the following description, in the form of a bimetalic switch. It goes without saying, however, that the operating and use principles of electronic device 1 according to the invention remain the same even if the mixture, for example of water and alcohol, described above, is substituted for the bimetalic switch.

One will now examine the method for using the temperature monitoring device 1 shown in FIGS. 1A and 1B with reference to FIGS. 4A to 4E.

Figure 4A:
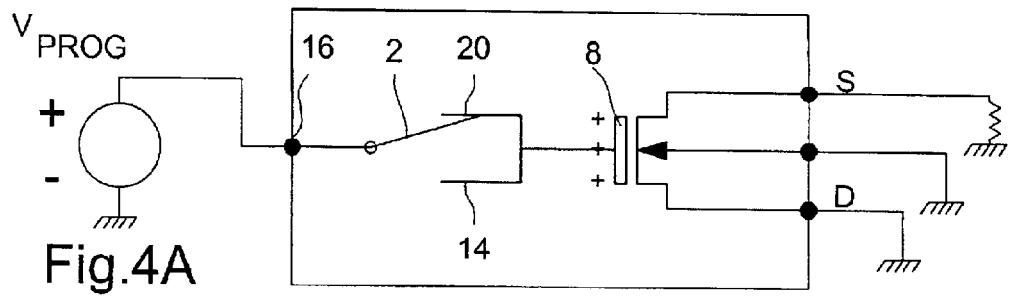
FIGS. 4A to 4E illustrate the method for implementing the temperature monitoring device shown in FIGS. 1A, 1B.
Figure 4B:
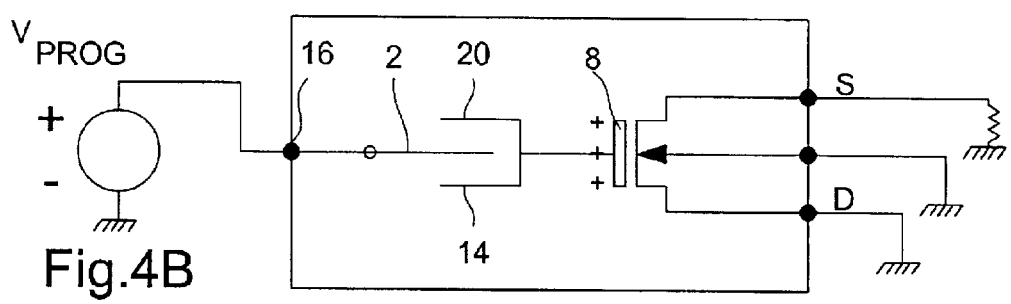

FIG. 4A shows the charge injection phase, also called the write phase, in floating gate 8. Upon examining FIG. 4A, it will be noted that bimetalic switch 2 is closed, which means that monitoring device 1 is at a temperature which is for example higher than the authorised maximum for the product to be checked. A programming voltage source $V_{PROG}$ is connected, via bimetalic switch 2, to floating gate 8, in order to inject the charges therein.

While maintaining the programming voltage, the temperature is then gradually decreased, so that contact means 2, or in other words the bimetalic switch, opens. Monitoring device 1 is then in the situation shown in FIG. 4B in which the charges are stored in floating gate 8 and bimetalic switch 2 is open, so that the stored charges cannot flow out. The programming voltage source $V_{PROG}$ can then be disconnected and monitoring device 1 is then ready to be affixed to the product which has to be monitored.

Figure 4C:
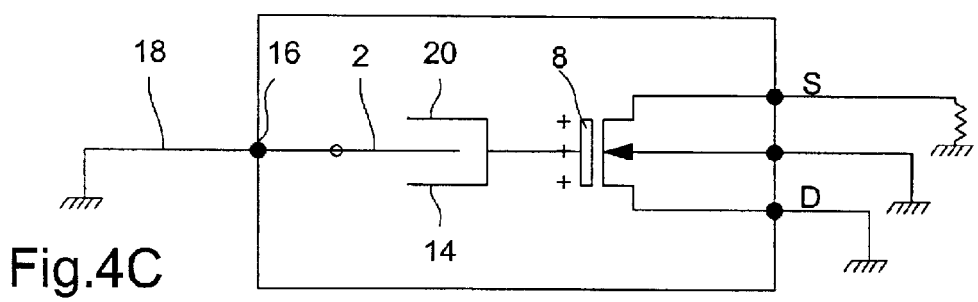

In FIG. 4C, monitoring device 1 is shown in conditions of use. This Figure shows that charges are stored in floating gate 8 and that bimetalic switch 2 is open. Source S, drain D and the substrate of the MOS transistor are all connected to earth. While bimetalic switch 2 remains open, floating gate 8 maintains its charge state, which means that the MOS transistor is ON and remains so as long as bimetalic switch 2 does not close.

Figure 4D:
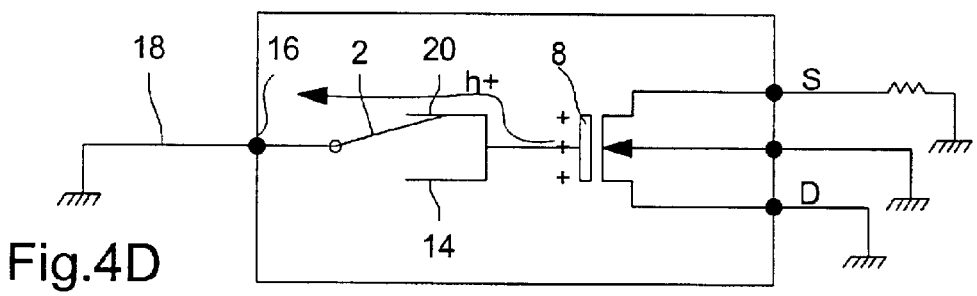
Figure 4E:
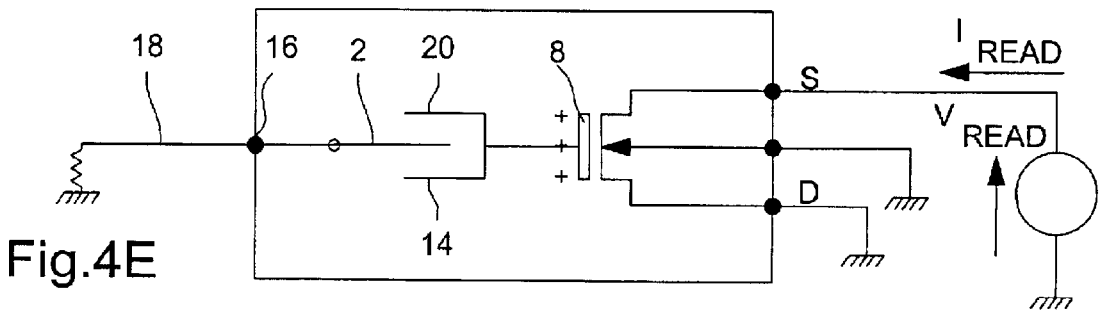

FIG. 4D shows the case in which the temperature of the medium to be monitored has reached its index limit value. At this moment, bimetalic switch 2 closes and the charges which were stored in floating gate 8 flow via said bimetalic switch 2 into charge flow circuit 18, in this case earth. It is important to note that this modification in the charge state of floating gate 8 is irreversible, insofar as it is impossible for the electric charges to flow back from earth to said floating gate 8. Thus, even if bimetalic switch 2 opens again via the effect of the temperature, the discharged state of floating gate 8 is preserved.

Via the effect of the flow of charges, the MOS transistor becomes less conductive or is switched OFF. There is thus a modification in the electric resistance of this MOS transistor, a modification which may be discerned by applying a read voltage $V_{READ}$ or a read current $I_{READ}$ between source S and drain D of said MOS transistor (see FIG. 4E) and by measuring the current, respectively the voltage, provided in response by the transistor. Indeed, the potential at which floating gate 8 is situated has a direct influence on the resistivity of the MOS transistor. Thus, depending upon whether gate 8 is or is not a carrier of electric charges, the resistivity of the MOS transistor will vary, which provides the person responsible for inspecting the products to be monitored with a reliable indication as regards the recommended index temperature during the entire temperature monitoring period prior to inspection. Thus, if one observes that the MOS transistor is OFF or less conductive, it will be deduced that the temperature has reached its index value at least once and that checked product will be immediately withdrawn from the distribution chain. Conversely, if the check proves negative, i.e. the MOS transistor has its initial conductivity corresponding to the moment that the charges were injected into its gate 8, the temperature check can continue.

At the end of use, monitoring device 1 according to the invention may advantageously be used again. In order to do this, one need only inject charges into floating gate 8 again in accordance with the procedure described hereinbefore. In order to avoid any fraudulent manoeuvres, a microprocessor will preferably be associated with monitoring device 1, so that the step of writing data in floating gate 8 obeys a coding algorithm controlled by the microprocessor and whose coding keys will only be known to authorised personnel.

It was assumed, hereinbefore, that an operator was responsible for inspecting the products to be monitored one by one. Such a task is of course tiresome and cannot be applied on a large scale. In order to do so, it is preferable to associate an electronic tag with each monitoring device 1 according to the invention. Such tags, which are known, are for example capable of storing different data such as a batch number and date of manufacture enabling the product to which it is affixed to be identified without any risk of error. The tag may include read and write means able to modify the data stored in said tag. The identification means include an integrated electronic circuit and an antenna formed of a coil of conductive wires. The integrated circuit includes encrypting means, means for converting the energy recuperated by the antenna to provide electric power to the integrated circuit and monitoring device 1 and a permanent memory. Thus, during a check carried out during the temperature monitoring period, on can pass a large number of products in front of an apparatus capable, by emitting an electromagnetic field, of powering read means 6 of monitoring device 1. In response, the integrated circuit will transmit to the remote interrogation device a signal representative of the charge state of floating gate 8 which can be associated with data identifying the products. This data is then stored in a computer memory to be kept and processed therein.

Owing to the addition of an electronic tag to monitoring device 1 according to the invention, the write step of the charge state of charge storage means 4 can be achieved on a large scale in an entirely automated manner and enables products which do not meet requirements to be immediately detected without any risk of error.

In the following description, those elements which are identical to those previously described with reference to FIGS. 1A, 1B and 4A to 4E will be designated by the same reference numerals.

Figure 5A:
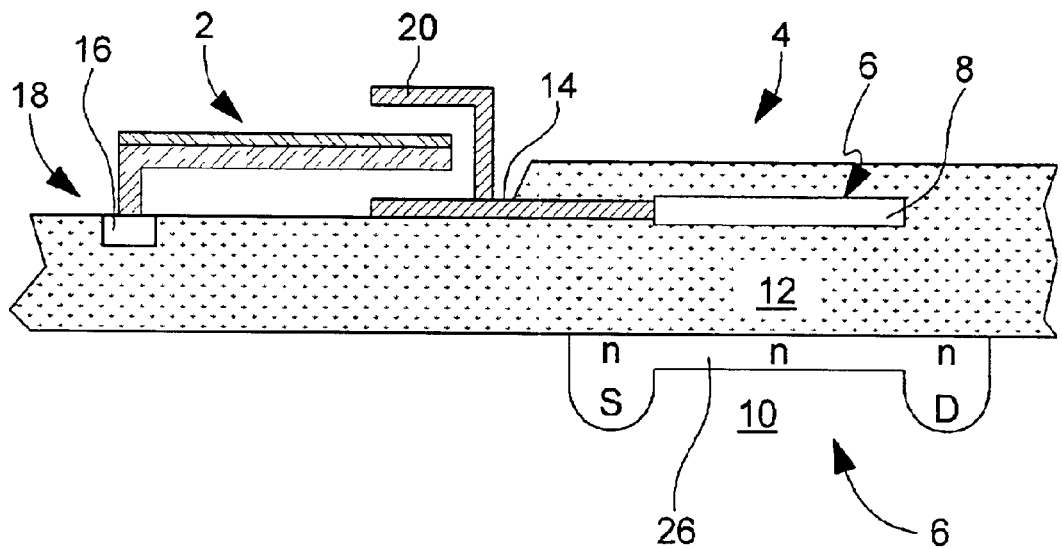
FIG. 5A is a cross-section of the temperature monitoring device according to the invention including a depletion type MOS transistor.

In the example shown in FIG. 5A, temperature monitoring device 1 includes a depletion type MOS transistor, for example with an n channel. Gate 8, which is electrically insulated from the depletion MOS transistor, forms the electric charge storage means according to the present invention, whereas source S and drain D, both of n type, constitute read means 6. Source S and drain D are connected to each other by a channel 26, also of n type, which exists in the OFF state.

Figure 5B:
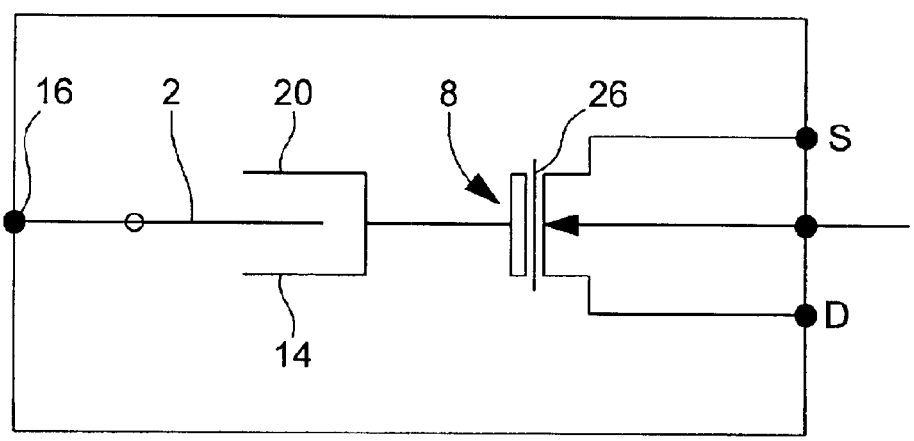
FIG. 5B is a schematic diagram of the electric circuit equivalent to the monitoring device shown in cross-section in FIG. 5A.

FIG. 5B is a schematic diagram of the equivalent electric circuit to the temperature monitoring device 1 according to the invention shown in cross-section in FIG. 5A. One will note, in particular, in this FIG. 5A the presence, between floating gate 8 and the substrate, of n channel 26 formed by implanting donor atoms under said gate 8 during the manufacturing process.

As is well known, a depletion transistor is normally in the ON state, i.e. a suitable voltage has to be applied to the gate to reduce or cancel out the current from the source to the drain by depleting the channel of charge carrier.

Figure 6A:
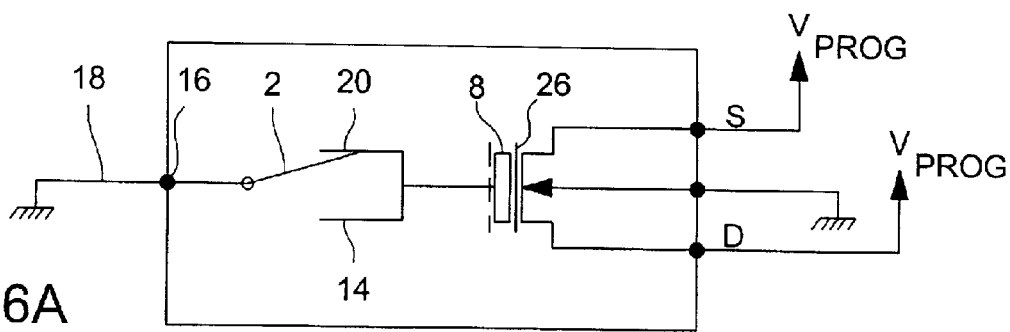
FIGS. 6A to 6E illustrate the method for implementing the temperature monitoring device shown in FIGS. 5A, 5B.

By taking inspiration from this operating principle, the depletion MOS transistor will be used to assure temperature monitoring in accordance with the method according to the invention. In order to do this, one starts by injecting charges into floating gate 8 (see FIG. 6A). This operation is led by bringing the potential of source S and drain D to a programming value $V_{PROG}$. For the entire duration of this operation of writing data in gate 8, contact means 2 are closed, i.e. monitoring device 1 is at a temperature outside the authorised range defined by the maximum and minimum thresholds that the temperature must not breach.

It will be understood that the injection of electric charges into floating gate 8 makes the depletion MOS transistor less conductive (or switches it to the OFF state) than it is in the rest state.

Figure 6B:
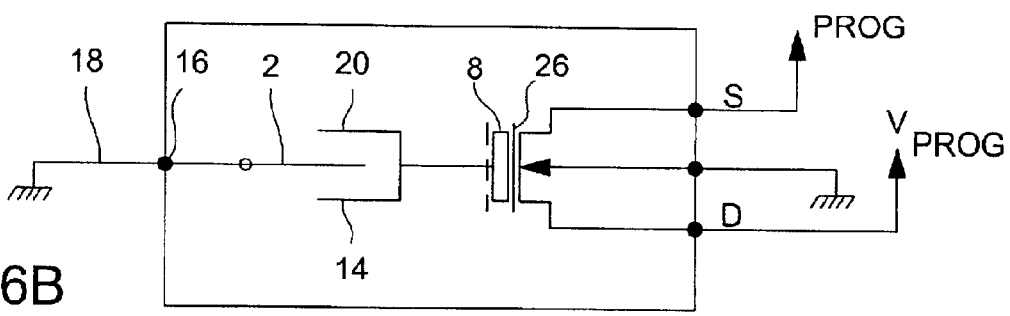

Next, while maintaining programming voltage $V_{PROG}$, the temperature is gradually brought to within the authorised range where it is lower than the maximum threshold and higher than the minimum threshold. Contact means 2 open and monitoring device 1 is then in the situation shown in FIG. 6B in which the electric charges are trapped by floating gate 8 and cannot flow in the direction of charge flow circuit 18. Programming voltage source $V_{PROG}$ can now be disconnected a monitoring device 1 can be affixed to the product whose temperature has to be monitored.

Figure 6C:
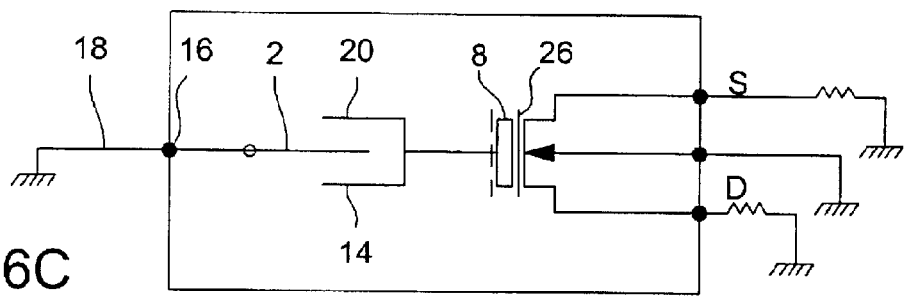

In FIG. 6c, temperature device 1 is shown in conditions of use. Source S, drain D and the substrate are connected to earth. The electric charges are stored in floating gate 8 and cannot flow out since bimetalic switch 2 is open. In other words, the temperature has not passed, for example, through its authorised maximum, and the product has thus not undergone any alteration capable of damaging its qualities.

Figure 6D:
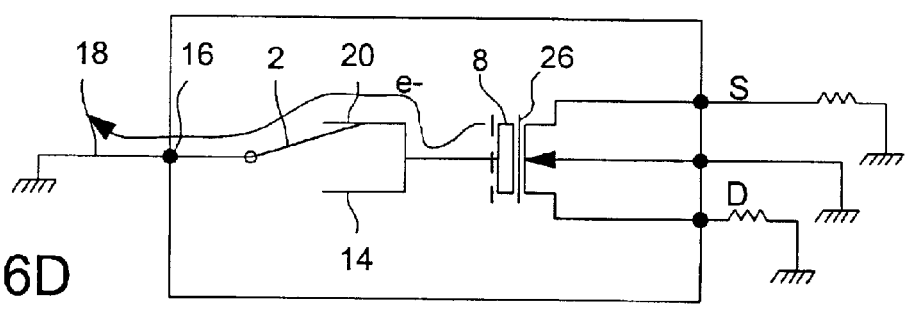
Figure 6E:
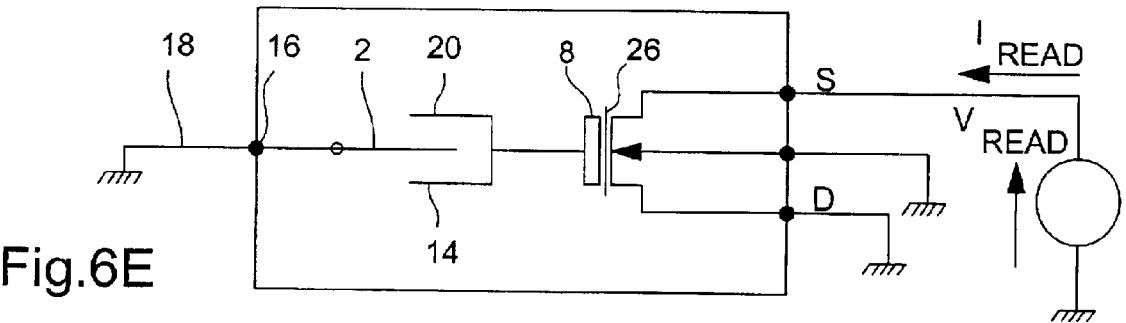

Conversely, in FIG. 6D, the temperature has reached its index value, which causes the closure of charge flow circuit 18 via bimetalic switch 2 and the flow of the electric charges which, until then, had been stored in floating gate 8. Via the effect of this modification in the charge state of floating gate 8, the MOS depletion transistor again becomes conductive. The potential to which gate 8 is brought has a direct influence on the conductivity of the depletion transistor. One need only then apply, between source S and drain D of said depletion transistor, a read current $I_{READ}$ or a read voltage $V_{READ}$ (see FIG. 6E) to determine the conductivity of the transistor and to deduce therefrom, as a function of the results obtained, the charge state of floating gate 8. If the transistor is slightly conductive, or blocked, this means that the electric charges are still present in gate 8 and that the temperature has not, at any time, reached one of its index values. If, conversely, the MOS depletion transistor is normally conductive, this means that the electric charges which were stored in floating gate 8 have escaped, and that the temperature has thus, at least at one moment, breached its threshold value.

It is important to recall here that the charge state of floating gate 8 is maintained whatever happens. Either the temperature has never reached its index value and in such case, the electric charges remain stored in floating gate 8, or the temperature has reached its index value, and in such case the electric charges stored in floating gate 8 have escaped.

When the charges escape, the modification in the charge state of gate 8 is irreversible, even if the temperature returns below its threshold value, since it is in no way possible for the electric charges which have flowed out to flow back to the floating gate.

The three embodiments which have just been described have two points in common: each uses MOS technology which consists in a set of design and manufacturing steps for the electronic components which, today, are remarkably well managed and allow reliable and inexpensive devices to be obtained. Moreover, whether one uses a standard or depletion MOS transistor, the electric charges are injected into floating gate 8 while bimetalic switch 2 is closed, i.e. the temperature is outside the authorised range. This may constitute a drawback insofar as, after the charges have been injected, the temperature has to be gradually brought back to a value conforming with the preservation conditions of the product to be monitored before monitoring device 1 according to the invention can be affixed to said product. However, standard and depletion MOS transistors differ in that the first becomes blocked or less conductive when the charges escape from floating gate 8, while the second becomes conductive again in the same conditions.

In order to overcome the aforementioned drawback, one may use non-volatile memory semiconductor component technology several examples of which will be described hereinafter.

Figure 7A:
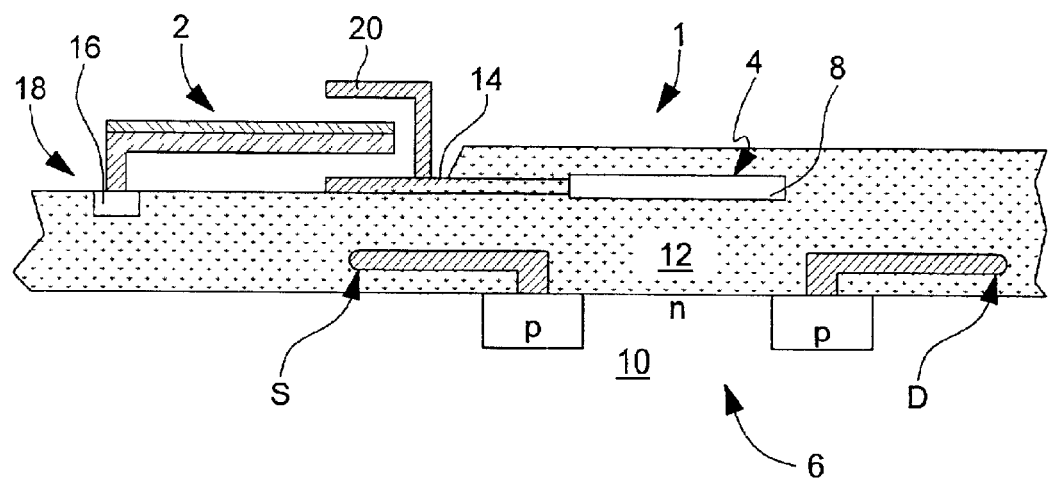
FIG. 7A is a cross-section of the temperature monitoring device according to the invention including an FAMOS transistor memory cell.

In the example shown in FIG. 7A, temperature monitoring device 1 includes a FAMOS transistor memory cell (floating gate avalanche injection MOS transistor). This is an MOS transistor including a floating gate 8, i.e. insulated from any conductor, electrically charged by avalanche effect. Gate 8 of the FAMOS transistor constitutes the electric charge storage means 4 and source S and drain D, for example of the p type in an n type well, form read means 6.

Figure 7B:
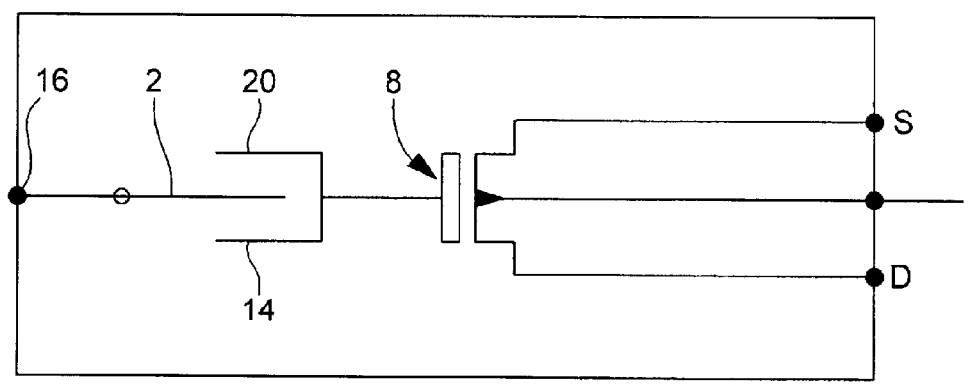
FIG. 7B is a schematic diagram of the electric circuit equivalent to the monitoring device shown in cross-section in FIG. 7A.

FIG. 7B is a schematic diagram of the electric circuit equivalent to the temperature monitoring device 1 according to the invention shown in cross-section in FIG. 7A.

Figure 8A:
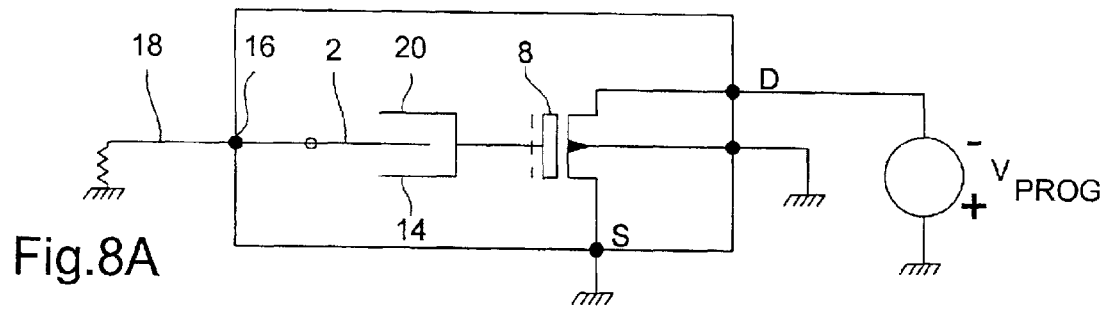
FIGS. 8A to 8D illustrate the method for implementing the temperature monitoring device shown in FIGS. 7A, 7B.

FIG. 8A shows the injection phase, also called the write phase, of the electric charges in floating gate 8. Upon examining FIG. 8A, it will be observed that bimetalic switch 2 is open, which means that monitoring device 1 is in an authorised temperature range corresponding to the optimal preservation conditions of the product to be monitored. A programming voltage source $V_{PROG}$ allows a negative voltage of the order of twenty to thirty volts to be applied between drain D of the FAMOS transistor and earth. Via the effect of programming voltage $V_{PROG}$, an avalanche occurs in the junction formed by source S and drain D of the transistor, the charge carriers multiplying after shock ionisation in the semiconductor material. Hot electrons, otherwise known as free electrons which, in the semiconductor material, have higher energy than that of the thermal equilibrium of the crystal lattice of said semiconductor material, are then injected into floating gate 8 from where they cannot escape since bimetalic switch 2 is open and the path towards electric flow circuit 18 is forbidden to them.

Figure 8B:
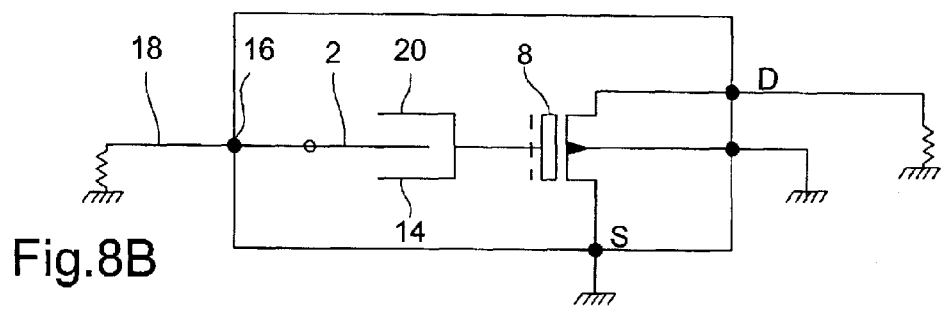

Once the charges are written in floating gate 8, programming voltage $V_{PROG}$ can be omitted and monitoring device 1 can be affixed to the product to be monitored. Monitoring device 1 is then in the situation shown in FIG. 8B in which bimetalic switch 2 is open and the electric charges remain stored in floating gate 8, so that the FAMOS transistor is potentially conductive and remains so provided that bimetalic switch 2 does not close. The charged state of floating gate 8 is thus maintained as long as the temperature does not breach its or one of its index values.

Figure 8C:
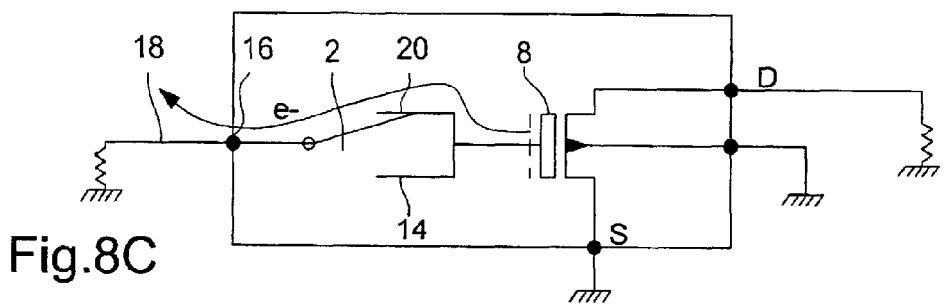

FIG. 8C shows the case in which the temperature of the medium to be monitored has reached its index value. At this moment, bimetalic switch 2 closes and the charges which were stored in floating gate 8 flow via said bimetalic switch 2 into charge flow circuit 18. This modification in the charge state of floating gate 8 is irreversible, insofar as the electric charges cannot be brought back to said gate 8. Thus, even if bimetalic switch 2 opens again via the effect of the temperature, the discharged state of floating gate 8 is maintained.

Figure 8D:
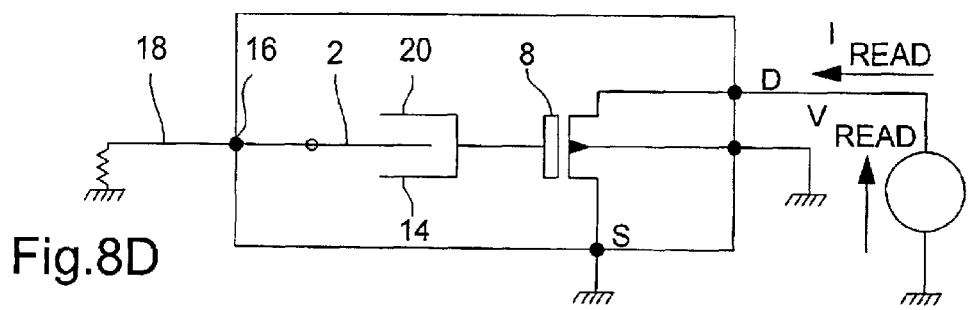

Via the effect of the electric charge flow, the FAMOS transistor becomes less conductive, or even blocked. There is thus a modification in the electric resistance of this FAMOS transistor, which may be detected by applying a read current $I_{READ}$ or a read voltage $V_{READ}$ between drain D of said FAMOS transistor and earth (see FIG. 8D), and by measuring the voltage, or respectively the current, supplied in response by the transistor. Indeed, the potential at which floating gate 8 is situated, has a direct influence on the resistivity of the FAMOS transistor. Thus, depending upon whether gate 8 is or is not an electric charge carrier, the resistivity of the FAMOS transistor will vary, which provides a precise and reliable indication as regards the prescribed index temperature during the entire temperature monitoring period prior to the inspection.

Figure 9A:
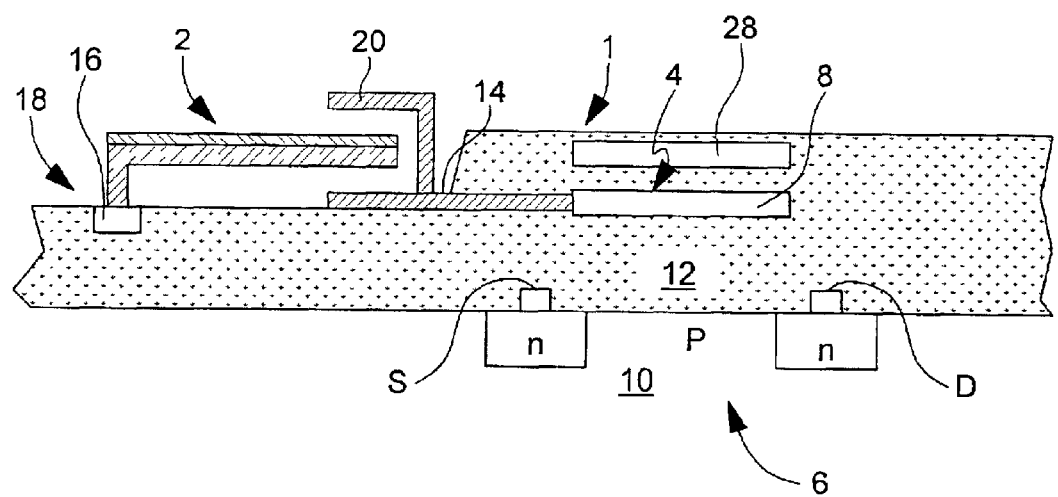
FIG. 9A is a cross-section of the temperature monitoring device according to the invention including an SIMOS transistor memory cell.

In the example shown in FIG. 9A, the temperature monitoring device 1 according to the invention includes an SIMOS (stacked-gate injection metal-oxide-semiconductor) transistor memory cell. The SIMOS memory is essentially formed by a transistor including a control gate 28 and a so-called floating gate which is arranged between source S and drain D at the surface of an electrically insulating $SiO_2$ layer 12 covering the surface of a semiconductor substrate 10 and carrying control gate 28. Floating gate 8 receives, via avalanche effect controlled by control gate 28, the electric charge assigned thereto. Floating gate 8 of the SIMOS transistor forms the charge storage means 4 and source S and drain D, for example formed by two n type wells implanted in a p type substrate, form read means 6.

Figure 9B:
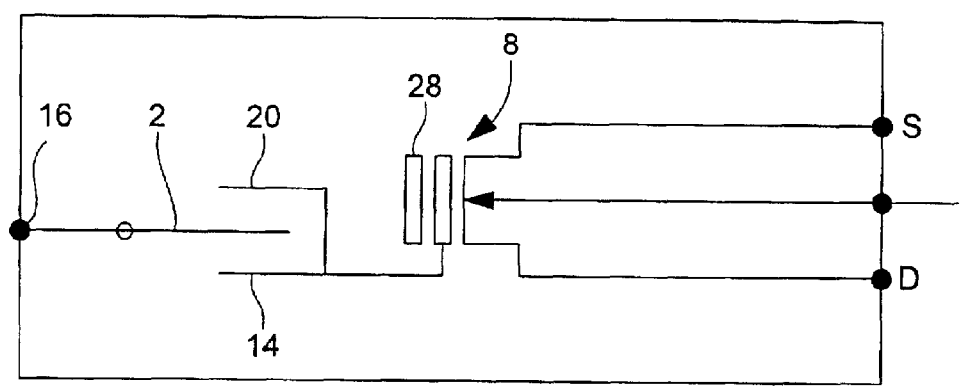
FIG. 9B is a schematic diagram of the electric circuit equivalent to the monitoring device shown in cross-section in FIG. 9A.

FIG. 9B is a schematic diagram of the electric circuit equivalent to the temperature monitoring device 1 according to the invention shown in cross-section in FIG. 9A. The presence of control gate 28 of the SIMOS transistor will be noted.

Figure 10A:
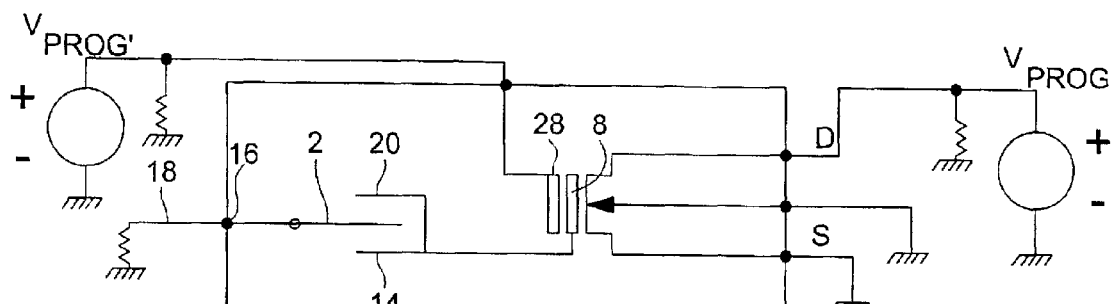
FIGS. 10A to 10D illustrate the method for implementing the temperature monitoring device shown in FIGS. 9A, 9B.

The step of injecting or writing the electric charges into the floating gate 8 of a SIMOS transistor is shown in FIG. 10A. This step differs from the step of injecting electric charges into the floating gate 8 of a FAMOS transistor as described hereinbefore with reference to FIG. 8A in that, in addition to the programming voltage source $V_{PROG}$ necessary for charge injection, a second programming voltage source $V_{PROG'}$ must also be used for polarising control gate 28, which controls the avalanche effect via which the electric charges, in this case holes $h^+$, are injected into floating gate 8.

As in the case of the FAMOS transistor described hereinbefore, writing data in a SIMOS transistor memory cell occurs while contact means 2 are open. Likewise, via the effect of charge injection, the SIMOS transistor becomes potentially conductive and remains so as long as contact means 2 do not close.

Figure 10B:
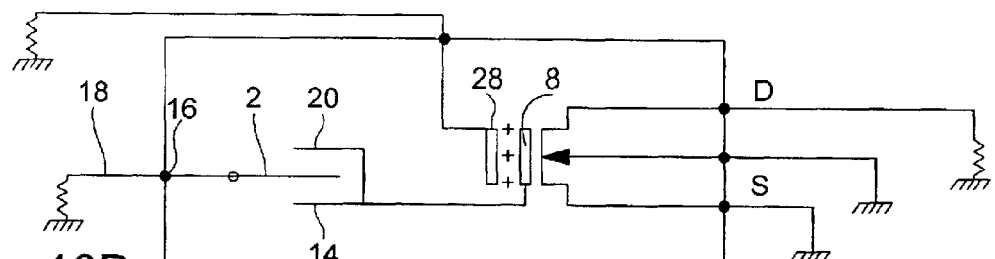

In FIG. 10B, programming voltage sources $V_{PROG}$ and $V_{PROG'}$ have been removed and control gate 28 is connected to earth. The temperature monitoring device 1, affixed to the product to be monitored, is in the state corresponding to the case in which the temperature has not reached its index value and in which, since bimetalic switch 2 is open, the electric charges remain stored in floating gate 2.

Figure 10C:
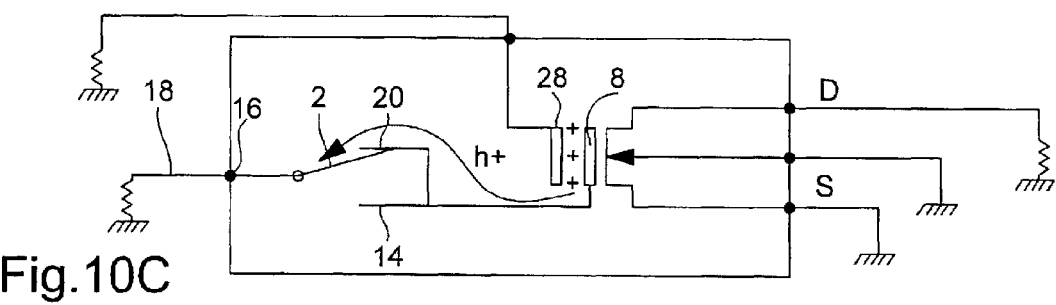

FIG. 10C shows the case in which the temperature has reached its index value and bimetalic switch 2 has closed. The charges which were stored in floating gate 8 then flow through bimetalic switch 2 towards charge flow circuit 18. As in all the examples which have been described until now, the modification in the charge state of floating gate 8 of the SIMOS transistor is irreversible, which means that the discharged state of said floating gate 8 is preserved even if the temperature subsequently passes below its threshold tolerance again and bimetalic switch 2 opens again.

Figure 10D:
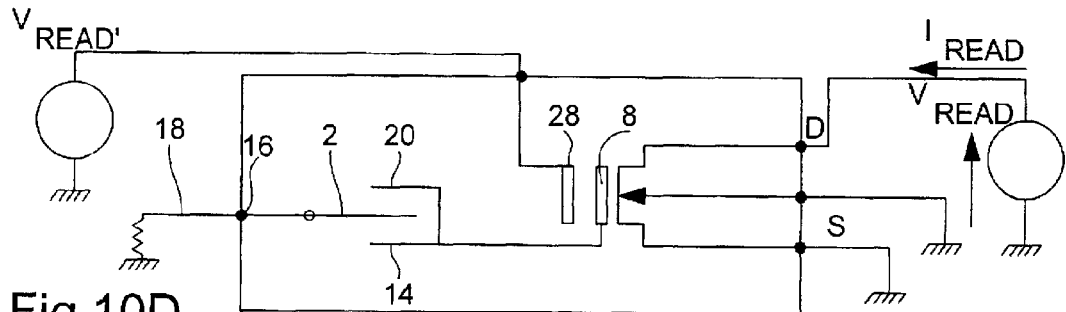

Via the effect of the charge flow, the SIMOS transistor becomes less conductive or blocked. There is thus a modification in the electric resistance of the SIMOS transistor, which can be detected by applying a read current $I_{READ}$ or a read voltage $V_{READ}$ between drain D of said SIMOS transistor and earth (see FIG. 10D), and by measuring the voltage, or respectively the current, provided in response by the transistor. As shown in FIG. 10D, the step of reading the charge state of floating gate 8 of the SIMOS transistor requires connecting control gate 28 of the transistor to a read potential $V_{READ}$.

Figure 11A:
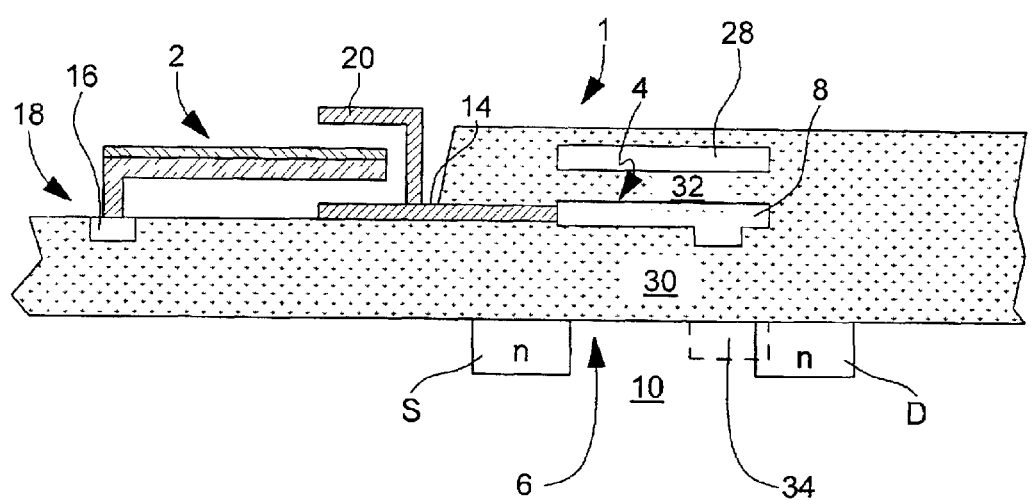
FIG. 11A is a cross-section of the temperature monitoring device according to the invention including a programmable and electrically erasable EEPROM memory cell.

In the example shown in FIG. 11A, the temperature monitoring device 1 according to the invention includes an electrically programmable and erasable EEPROM memory cell. An EEPROM cell is intended to allow the non-volatile storage of data. An EEPROM cell thus commonly takes the form of an insulated or floating gate field effect transistor 8, capable of accumulating electric charges and capacitively coupled to a control gate 28. The floating gate 8, made of polysilicon, is arranged above the transistor channel and is separated from substrate 10 by a first dielectric layer 30. Control gate 28 of the transistor is capacitively coupled to floating gate 8 from which it is separated by a second dielectric layer 32.

The potential of floating gate 8 is determined by the voltage applied across control gate 28 and the capacitive coupling ratio of the EEPROM cell, i.e. the capacitive ratio between the capacitance formed by the dielectric layer 32 existing between control gate 28 floating gate 8, and the capacitance formed by the dielectric oxide layer 30 existing between floating gate 8 and the transistor channel.

Depending upon the combination of voltages applied to control gate 28, the inversion layer (channel) and the diffusion regions (source S and drain D regions) of the transistor, operations, in particular programming, can be carried out.

Thus, in order to programme the EEPROM cell, i.e. to inject for example h+holes in floating gate 8 of a p channel MOS (pMOS) transistor, one method consists in applying a high programming voltage to control gate 28 of the transistor and connecting the channel and source S and drain D regions to earth. In this case, if the electric field in the dielectric oxide layer 30 located under floating gate 8 is sufficiently high, holes can be injected from an injector or injection zone 34 by tunnel effect into floating gate 8 of the EEPROM cell.

Figure 11B:
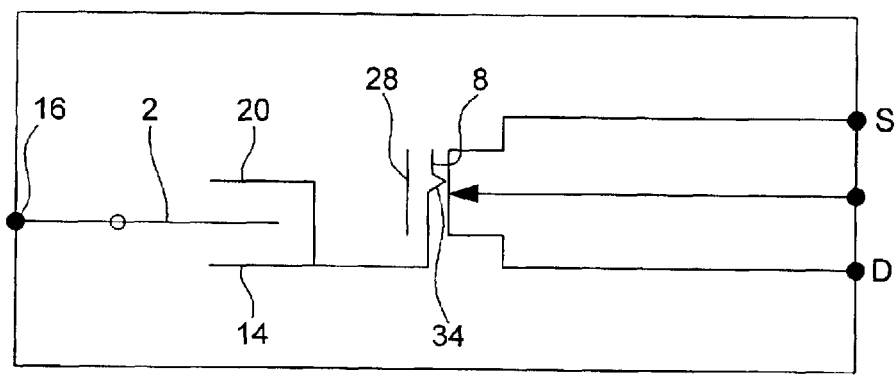
FIG. 11B is a schematic diagram of the electric circuit equivalent to the monitoring device shown in cross-section in FIG. 11A.

FIG. 11B is a schematic diagram of the electric circuit equivalent to the temperature monitoring device 1 according to the invention shown in cross-section in FIG. 11A. The presence of control gate 28 and injector 34 of the pMOS transistor will be noted in this Figure.

Figure 12A:
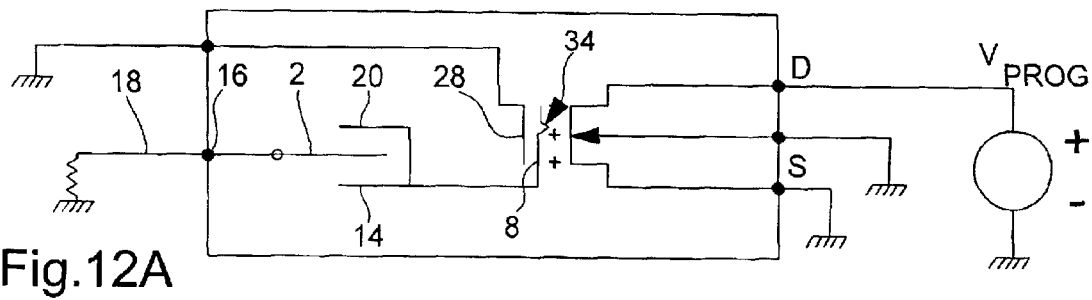
FIGS. 12A to 12D illustrate the method for implementing the temperature monitoring device shown in FIGS. 11A, 11B.

The step of injecting or writing electric charges into floating gate 8 of the EEPROM memory cell is shown in FIG. 12A. This step, which was described in detail hereinbefore, requires bringing drain D of the MOS transistor to a programming voltage $V_{PROG}$. An examination of FIG. 12A shows that the charge injection step occurs while bimetalic switch 2 is open, which means that the temperature is at an authorised value corresponding to correct preservation conditions for the product to be monitored. Via the effect of charge injection, the MOS transistor becomes conductive and remains so as long as contact means 2 do not close.

Figure 12B:
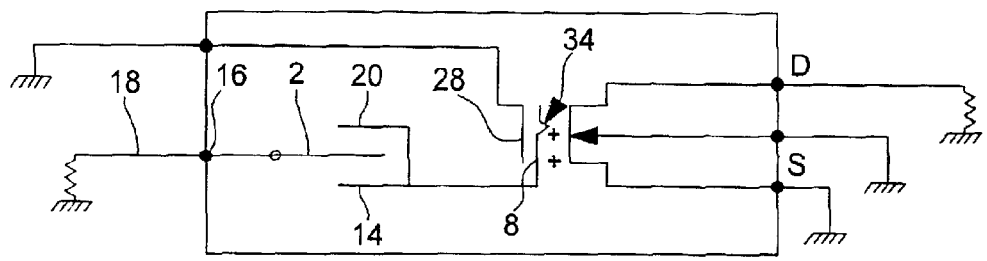

In FIG. 12B, programming voltage source $V_{PROG}$ has been removed, drain D, source S, substrate 10 and control gate 28 all being connected to earth. Temperature monitoring device 1, affixed to the product to be monitored, is in the state corresponding to the case in which the temperature has not reached its index value and in which, since bimetalic switch 2 is open, the electric charge remain stored in floating gate 8. This charged state of floating gate 8 is maintained as long as nothing happens, i.e. as long as the temperature does not reach its index value and bimetalic switch 2 does not close.

Figure 12C:
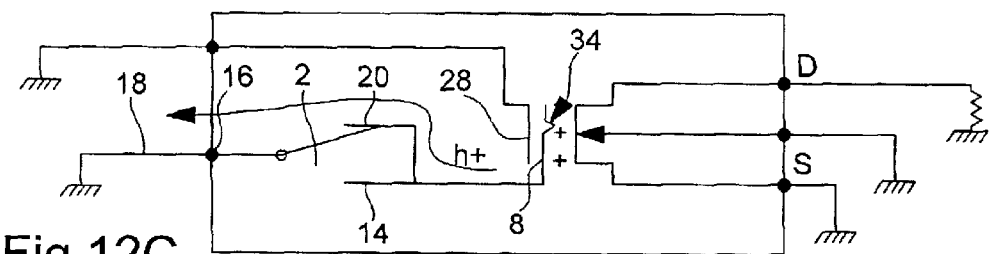

In FIG. 12C, the temperature has reached its index value. Via the effect of this temperature variation, bimetalic switch 2 has closed and the charges which, until then, were stored in floating gate 8, have flowed into charge flow circuit 18. The new discharged state of floating gate 8 is maintained subsequently, even if the temperature returns to an authorised value and bimetalic switch 2 opens again.

Figure 12D:
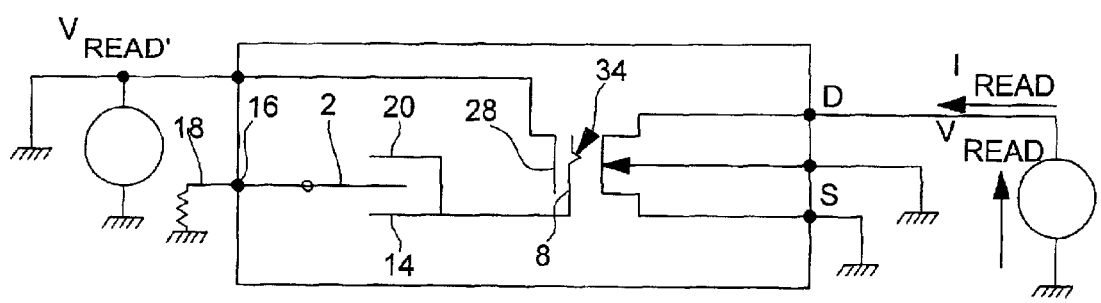

Of course, via the effect of the charge flow, the EEPROM memory cell transistor becomes less conductive, or blocked. There is thus a modification in the electric resistance of the transistor which can be detected by applying a read current $I_{READ}$ or a read voltage $V_{READ}$ between the transistor drain D and earth (see FIG. 12D), and by measuring the voltage, or respectively the current, provided in response by the transistor. Control gate 28 can be, as desired, connected to earth or to a read potential $V_{READ}$, during the read phase of the EEPROM memory cell.

Figure 13A:
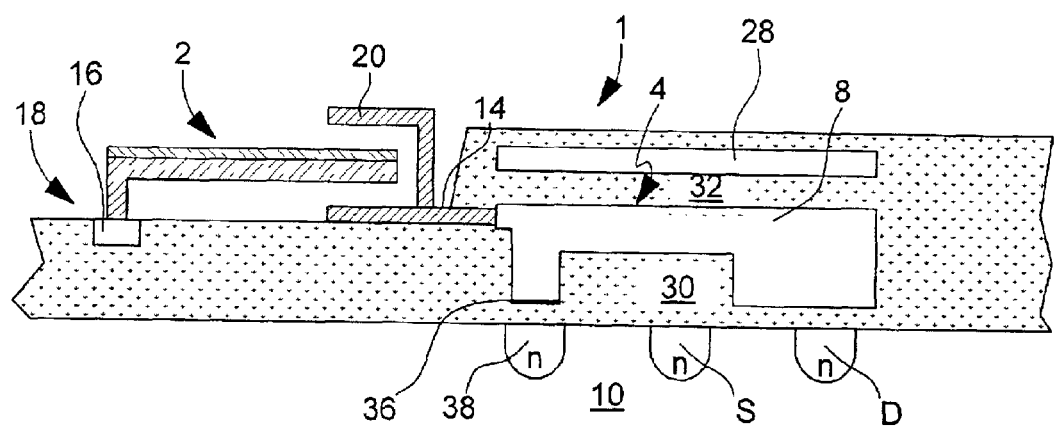
FIG. 13A is a cross-section of the temperature monitoring device according to the invention including an EPLD separate injector memory cell.

In the example shown in FIG. 13A, the temperature monitoring device 1 according to the invention includes a separate injector memory cell of the EPLD type known as an "electrically programmable logic device". An EPLD memory cell is intended to allow storage of data. The EPLD cell thus includes a field effect MOS transistor with an insulated gate or floating gate 8, capable of accumulating electric charges and capacitively coupled to a control gate 28. The floating gate 8, is arranged above the transistor channel and is separated from semiconductor substrate 10 by a dielectric layer 30. Control gate 28 of the transistor is capacitively coupled to floating gate 8 from which it is separated by a dielectric layer 32.

Thus, in order to programme the EPLD cell, i.e. to inject for example h+ holes into floating gate 8 of a p channel MOS (pMOS) transistor, one method consists in applying a high programming voltage $V_{PROG}$ to floating gate 8 of the transistor and connecting the inversion layer (channel) and diffusion regions (source S and drain D regions) to earth. In this case, if the electric field is sufficiently high, holes can be injected by tunnel effect through an oxide layer 36 located under floating gate 8 from an injection zone 38 arranged opposite oxide layer 36 in substrate 10.

Figure 13B:
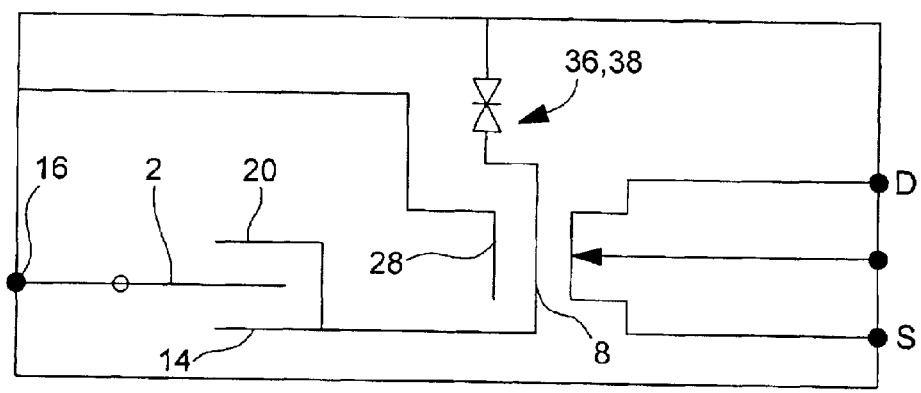
FIG. 13B is a schematic diagram of the electric circuit equivalent to the monitoring device shown in cross-section in FIG. 13A.

FIG. 13B is a schematic diagram of the electric circuit equivalent to the temperature monitoring device 1 according to the invention shown in cross-section in FIG. 13A. The presence of control gate 28 and oxide layer 36, which allows charges to be injected into floating gate 8 by tunnel effect, will be noted in this Figure. This oxide layer 36 and injection zone 38 that is associated therewith form an MIS (metal-insulator-conductor) type diode.

Figure 14A:
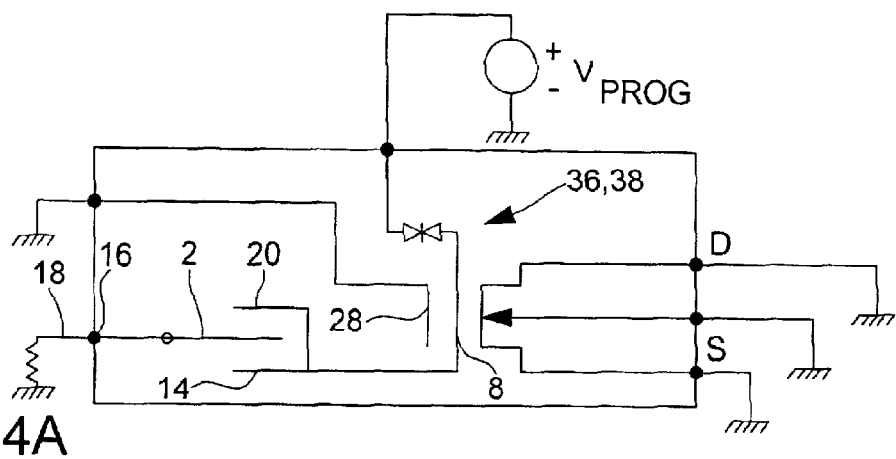
FIGS. 14A to 14D illustrate the method for implementing the temperature monitoring device shown in FIGS. 13A, 13B.

The step of injecting or writing electric charges into floating gate 8 of the EPLD memory cell is shown in FIG. 14A. This step, which was described in detail hereinbefore, requires bringing floating gate 8 to a programming voltage $V_{PROG}$, while control gate 28 is connected to earth. The step of writing data into floating gate 8 occurs while bimetalic switch 2 is open. Via the effect of charge injection, the MOS transistor of the EPLD memory cell becomes conductive and remains so as long as contact means 2 do not close, i.e. as long as the temperature does not reach its index value.

Figure 14B:
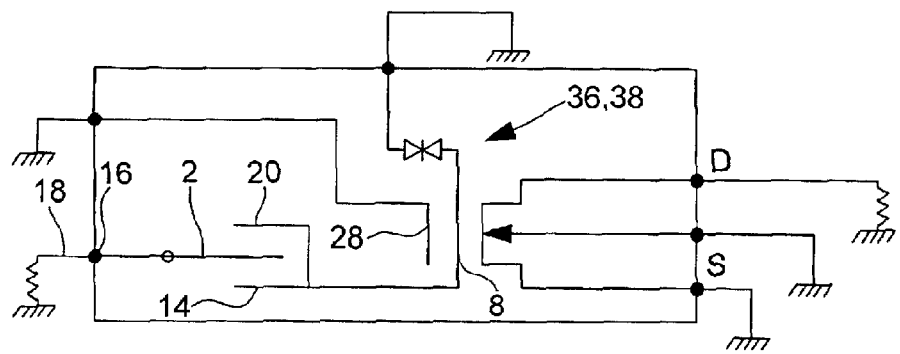

In FIG. 14B, programming voltage source $V_{PROG}$ has been removed, and tunnel effect injector 38 has been connected to earth. Temperature monitoring device 1, affixed to the product to be monitored, is in the state corresponding to the case in which the temperature has never, during the monitoring period preceding the check, reached its index value and in which the electric charges remain stored in floating gate 8 insofar as contact means 2 have not closed. This charged state of floating gate 8 is maintained as long as nothing happens, i.e. as long as contact means 2 do not close via the effect of a temperature variation.

Figure 14C:
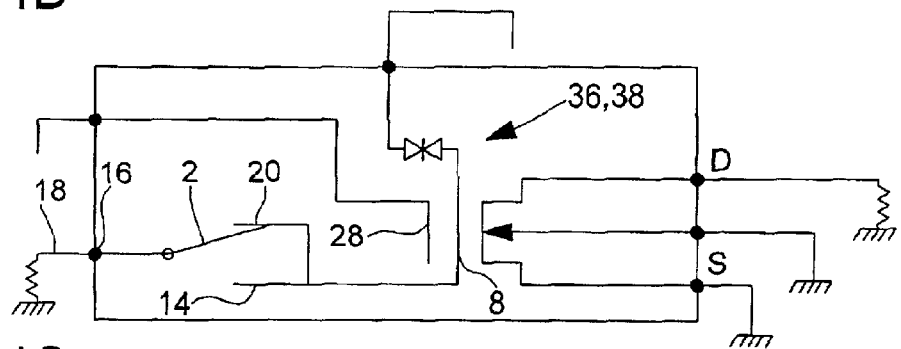
Figure 14D:
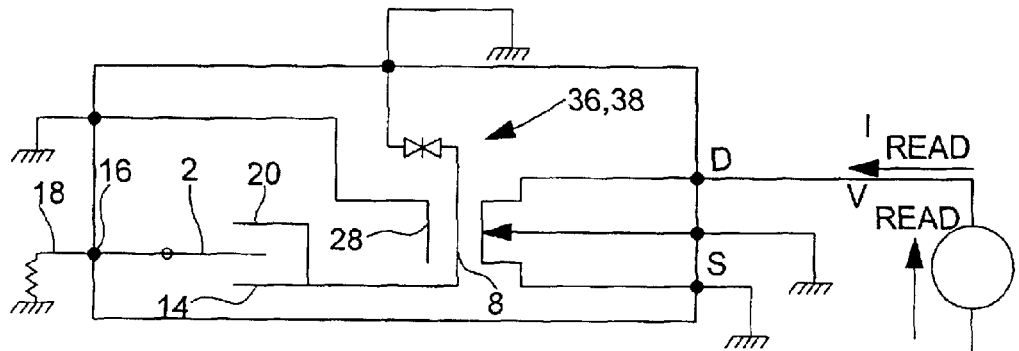

In FIG. 14C, bimetalic switch 2 has closed since the temperature has reached its index value and the electric charges have escaped from floating gate 8 to flow through said bimetalic switch 2 into charge flow circuit 18. Via the effect of charge flow, the MOS transistor of the EPLD memory cell becomes less conductive, or blocked. There is thus a modification in the electric resistance of the transistor, which can be detected by applying a read current $I_{READ}$ or read voltage $V_{READ}$ between drain D and earth (see FIG. 14D), and by measuring the voltage, or respectively the current, provided by the transistor. Advantageously, the step of reading the charge state of floating gate 8 occurs with injector 38 connected to earth. Of course, the discharged state of floating gate 8 is maintained even if, subsequently, contact means 2 open again.

Figure 15:
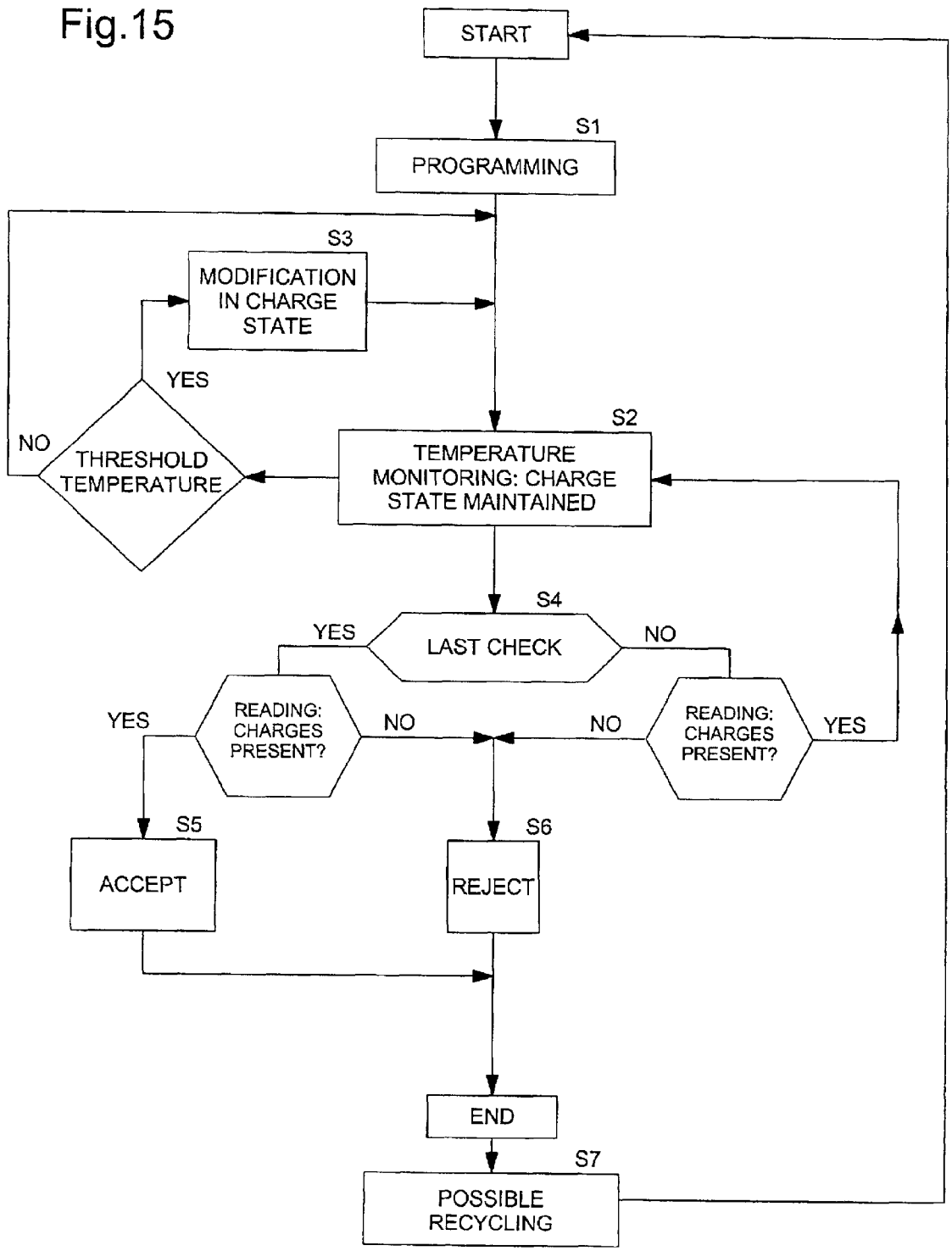
FIG. 15 illustrates the method for implementing the temperature monitoring device according to the invention.

FIG. 15 illustrates the method for implementing temperature monitoring device 1 according to the invention. The method starts at step S1 by programming floating gate 8, in other words the step during which electric charges are injected into said floating gate 8. As was described fully hereinbefore, the programming step can be achieved, in accordance with standard MOS technology or the non-volatile memory technology used, with contact means 2 open or closed. Via the effect of the injection of charges into charge storage means 4, the latter can become conductive or conversely be in the blocked state.

After step S1 of injecting electric charges into charge storage means 4, monitoring device 1 can be affixed to the products whose preservation temperature has to be monitored. Temperature monitoring step S2 then starts during which the charge state of charge storage means 4 is capable of being modified. Thus, if, as shown in step S3, the temperature has reached its threshold value, there is an irreversible modification in the charge state of the storage means. It is essential to understand that this modified charge state of charge storage means 4 will be kept whatever the subsequent evolution of the temperature. Thus, even if the temperature again passes below its authorised maximum and, consequently, contact means 2 open again, this will not enable electric charge storage means 4 to return to their initial charge state. Of course, the charged state of charge storage means 4 is also maintained during the entire temperature monitoring period when the temperature has not, at any moment, reached its index value. If, at step S4, the last check is carried out, one has to ensure that the electric charges are still present across floating gate 8. If this is the case (step S5), this means that the temperature has never reached its or one of its index values and that the properties of the product to which monitoring device 1 has been affixed have not been altered. If, conversely, the charges are absent (step S6), the product must be rejected. If step S4 is not the last check, one must nonetheless ensure that the electric charges are present. If this is not the case, the product must immediately be rejected (step S6). However, if the charges are still present in floating gate 8, the temperature monitoring process can continue and one returns to step S2. At the end of the last check (step S4), whether the product is eventually accepted (step S5) or rejected (step S6), one reaches the end of the temperature monitoring process and monitoring device 1 according to the invention may then be recycled (step S7).

Figure 16:
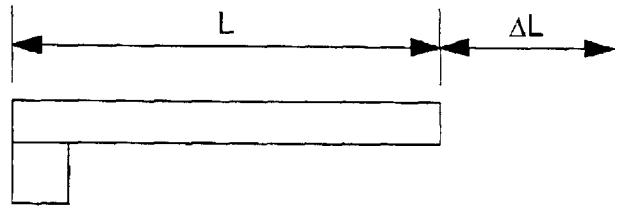
FIG. 16 shows a first embodiment (rod) of the contact means of the temperature monitoring device according to the invention.

Finally, one will examine, with reference to FIG. 16 and the following Figures, embodiments of contact means 2, the closure of which causes floating gate 8 to be connected to electric charge flow circuit 18.

In FIG. 16, contact means 2 are formed by a simple aluminium bar whose thermal expansion coefficient per unit length is equal to $\delta = 25.10^{-6}$ m/° K. An elongation $\Delta L$ via the effect of a temperature variation $\Delta T$ in the aluminium bar of length L is defined by the relation:

$$\Delta L = L \times \delta \times \Delta T \qquad (1)$$

Assuming that an elongation $\Delta L = 0.1$ μm is sought for a temperature variation $\Delta T = 1°$ K, the length L of the aluminium bar will have to be:

$$L = \frac{\Delta L}{\delta \times \Delta T} = \frac{0,1 \times 10^{-6}}{25 \times 10^{-6}} = 4.10^{-3} \text{ m} = 4 \text{ mm} \qquad (2)$$

An aluminium bar, which is 4 mm in length, will have to be provided in order to be able to observe an elongation of the bar of 0.1 μm when the temperature rises by 1° K.

Figure 17:
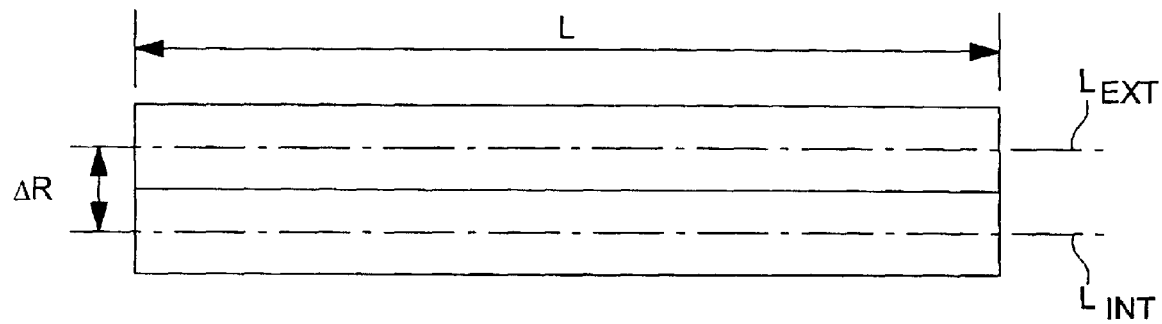
FIG. 17 shows a second embodiment (bimetallic switch) of the contact means of the temperature monitoring device according to the invention.

In FIG. 17, it is assumed that contact means 2 consists of a bimetalic switch formed of two attached strips each of a length of 100 μm and one of which is made, for example of aluminium, whose expansion coefficient per unit length is $\delta_{Al} = 25.10^{-6}$ m/° K, and the other is made of silicon for example, whose expansion coefficient per unit length is $\delta_{Si} = 3.10^{-6}$ m/° K. The length of 100 μm is randomly chosen, but is a common value in the integrated circuit manufacturing field.

As shown in FIG. 17, the longitudinal lines of symmetry of the aluminium bar and the silicon bar are respectively called $L_{INT}$ and $L_{EXT}$ and are separated by a distance of $\Delta R = 1$ μm.

Figure 18:
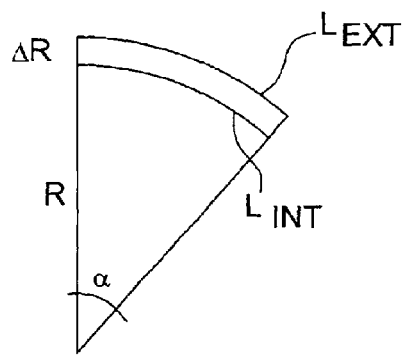
FIG. 18 shows the bimetalic switch of FIG. 17 in a bent state under the effect of a temperature variation.

In FIG. 18, it is assumed that the bimetalic switch is bent on the side of the silicon strip. The radius of curvature along which the bimetalic switch is bent is designated R, and the angle which intercepts the arc of a circle formed by said bent bimetalic switch is designated α. One thus obtains:

$$L_{INT} = \alpha R \qquad (2)$$

$$L_{EXT} = \alpha(R + \Delta R) \qquad (3)$$

hence $$\frac{L_{EXT}}{L_{INT}} = \frac{\alpha(R + \Delta R)}{\alpha R} = 1 + \frac{\Delta R}{R} \qquad (4)$$

Assuming that the bimetalic switch is bent via the effect of a temperature variation of 1° K, the relation (4) defined hereinbefore becomes:

$$\frac{L_{EXT}}{L_{INT}} = \frac{100 + 100 \times 25 \cdot 10^{-6}}{100 + 100 \times 3 \cdot 10^{-6}} = 1,000022 = 1 + \frac{\Delta R}{R}$$

and $\Delta R = 1 \ \mu m = 10^{-6}$ m, hence:

$$R = \frac{10^{-6}}{22 \times 10^{-6}} = 0,045 \ m = 45454 \ \mu m$$

The radius of curvature is thus equal to R=45454 µm.

Figure 19:
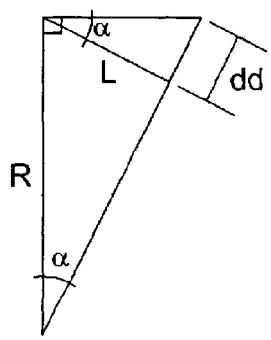
FIG. 19 is a schematic diagram of the bimetalic switch used for determining the deflection of the latter via the effect of a temperature variation.

It is now sought, with reference to FIG. 19, to determine the deflection, noted dd, of the bimetalic switch for a temperature variation of 1° K:

$$dd = L\sin\alpha = L \times \frac{L}{R} = \frac{100 \times 100}{45454} = 0,22 \ \mu m/° \ K.$$

Consequently, for a bimetalic switch formed of two strips of aluminium and silicon each of a length of 100 µm, a curvature of 0.22 µm is observed for a temperature increase of 1° K.

It goes without saying that the invention is not limited to the embodiments which have just been described, and that simple modifications and variants can be envisaged without departing from the scope of the present invention.

What is claimed is:

1. A passive electronic device for monitoring the temperature of a medium to be monitored enabling one to make sure that the temperature has not reached at least a pre-established index limit value, wherein it includes:

electrically conductive contact means able to close an electric charge flow circuit when said temperature reaches the or one of the index limit values;

electric charge storage means able to be connected to the charge flow circuit when the contact means close, the charges stored in these storage means being kept as long as the temperature does not reach its or one of its index limit values, and being able to flow through said charge flow circuit when the circuit is closed by said contact means, said storage means not returning to the charge state which they had before the charge flow circuit closed if the latter opens again, and read means enabling the charge state of said storage means to be determined.

2. The electronic device according to claim 1, wherein the charge storage means include a floating gate separated from a semiconductor substrate by an electrically insulating layer, the floating gate having an electric contact point that is accessible from the exterior and that can be connected to an electric contact point of the charge flow circuit.

3. The electronic device according to claim 2, wherein, in order to be able to evaluate the impedance of the read means and thus to determined the charge state of the floating gate, an oscillator circuit is associated with the read means, a remote interrogation device being able to be coupled to said read means.

4. The electronic device according to claim 3, wherein the read means include a pn junction formed at least in part under the floating gate.

5. The electronic device according to claim 3, wherein the read means include a bipolar transistor formed at least in part under the floating gate.

6. The electronic device according to claim 3, wherein the read means include a pn junction formed at least in part under the floating gate.

7. The electronic device according to claim 2, wherein the read means include a bipolar transistor formed at least in part under the floating gate.

8. The electronic device according to claim 2, wherein, in order to be able to evaluate the impedance of the read means and thus to determined the charge state of the floating gate, an oscillator circuit is associated with the read means, a remote interrogation device being able to be coupled to said read means.

9. The electronic device according to claim 2, wherein the read means include a pn junction formed at least in part under the floating gate.

10. The electronic device according to claim 2, wherein the storage and read means include a non-volatile semiconductor memory cell.

11. The electronic device according to claim 1; wherein it includes an MOS type transistor whose gate, which is electrically insulated, forms the storage means, and whose source and drain form the read means.

12. The electronic device according to claim 11, wherein it includes a depletion MOS type transistor.

13. The electronic device according to claim 1, wherein the storage and read means include a non-volatile semiconductor memory cell.

14. The electronic device according to claim 13, wherein the semiconductor memory cell is chosen from the group formed by FAMOS type cells, SIMOS type cells, EEPROM type cells and EPLD separate injector memory cells.

15. The electronic device according to claim 1, wherein the contact means are formed by a material that conducts electricity and having a precise solidification and melting temperature.

16. The device according to claim 15, wherein the electrically conductive material is a mixture of an antifreeze liquid and water the proportions of which determine the solidification and melting temperature of the mixture.

17. The electronic device according to claim 16, wherein the antifreeze liquid is alcohol.

18. The electronic device according to claim 1, wherein the contact means are made of a metallic material capable of expanding or contracting as a function of temperature fluctuations.

19. The electronic device according to claim 18, wherein the metallic material is chosen from the group formed by aluminium, silver, copper, steel, iron, invar, nickel, gold, platinum, lead, silicon, tungsten and zinc.

20. The electronic device according to claim 19, wherein the contact means take the form of a rectilinear bar.

21. The electronic device according to claim 19, wherein the contact means take the form of a bimetallic switch.

22. The electronic device according to claim 18, wherein the contact means take the form of a rectilinear bar.

23. The electronic device according to claim 18, wherein the contact means take the form of a bimetallic switch.

24. The electronic device according to claim 1, wherein it is associated with an electronic tag.

25. A method for implementing an electronic device for monitoring the temperature of a medium to be monitored enabling one to make sure that the temperature has not reached at least a pre-established index limit value, this electronic device including:

electrically conductive contact means able to close an electric charge flow circuit when said temperature reaches the or one of the index limit values;

electric charge storage means able to be connected to the charge flow circuit when the contact means close, the charges stored in these storage means being kept as long as the temperature does not reach its or one of its index limit values, and being able to flow through said charge flow circuit when the circuit is closed by said contact means, said storage means not returning to the charge state which they had before the charge flow circuit closed if the latter opens again, and read means enabling the charge state of said storage means to be determined, the method comprising the steps of:

writing data by injecting electric charges into the charge storage means;

placing the electronic device in the medium whose temperature evolution one wishes to monitor in order to ensure that this temperature has not reached at least one pre-established index limit value;

reading, in a non destructive manner, while the device is still in the medium to be monitored, the data written in the charge storage means, so as to determine whether or not the temperature of said medium to be monitored has, at a given moment, reached its or one of its pre-established index limit values, knowing that if the temperature has not reached its or one of its index limit values, the contact means are not closed and the charge state of the charge storage means has remained unchanged, whereas if the temperature has reached its or one of its index limit values, the contact means have closed and the charge state of the charge storage means has been modified, this modified charge state of the charge storage means being preserved even if the temperature of the medium being monitored again passes below or beyond the index value which it has reached and the contact means open again;

continuing or stopping temperature monitoring and, if necessary, reprogramming the electronic temperature monitoring device in order to use it again.

26. The method according to claim 25, wherein the step of writing data by injecting electric charges into the charge storage means occurs while the contact means are closed.

27. The method according to claim 26, wherein the step of reading data written in the electric charge storage means is achieved by applying an electric current or voltage across the terminals of said charge storage means which, in response, provide a voltage, or respectively a current allowing the electric resistance of said storage means, and thus their electric charge state, to be determined.

28. The method according to claim 25, wherein the step of writing data by injecting electric charges into the charge storage means occurs while the contact means are open.

29. The method according to claim 28, wherein the step of reading data written in the electric charge storage means is achieved by applying an electric current or voltage across the terminals of said charge storage means which, in response, provide a voltage, or respectively a current allowing the electric resistance of said storage means, and thus their electric charge state, to be determined.

30. The method according to claim 25, wherein the step of reading data written in the electric charge storage means is achieved by applying an electric current or voltage across the terminals of said charge storage means which, in response, provide a voltage, or respectively a current allowing the electric resistance of said storage means, and thus their electric charge state, to be determined.

* * * * *